United States Patent
O'Donnell

(12) 
(10) Patent No.: US 6,414,241 B1
(45) Date of Patent: *Jul. 2, 2002

(54) ENCLOSURE FOR INTERFACING ELECTRICAL AND CONTROL OR COMMUNICATION DEVICES

(75) Inventor: Patrick O'Donnell, Victoria (CA)

(73) Assignee: Christopher J. Carter, Victoria (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/574,960

(22) Filed: May 19, 2000

Related U.S. Application Data

(63) Continuation of application No. 09/046,370, filed on Mar. 23, 1998, now Pat. No. 6,091,023.

(30) Foreign Application Priority Data

Jan. 21, 1998 (CA) ............................................ 2227659

(51) Int. Cl.⁷ ................................................ H01H 9/02
(52) U.S. Cl. .......................... 174/57; 174/50; 220/3.92
(58) Field of Search ............................ 174/50, 53, 57, 174/58, 65 R; 220/3.2, 3.3, 3.7, 3.92, 3.94, 4.02

(56) References Cited

U.S. PATENT DOCUMENTS

| | | | |
|---|---|---|---|
| 1,437,324 A | | 11/1922 | Tashjian |
| 1,534,723 A | * | 4/1925 | Lewis ........................ 220/3.94 |
| 1,829,648 A | | 10/1931 | Haering |
| 3,082,290 A | | 3/1963 | Ohmit |
| 3,146,298 A | | 8/1964 | Ceglia |
| 3,365,535 A | | 1/1968 | Wilk |
| 3,371,149 A | | 2/1968 | Maxted |
| 3,587,906 A | | 6/1971 | Pepe |
| 3,622,029 A | | 11/1971 | Ware |
| 3,690,501 A | | 9/1972 | Ware |
| 3,701,837 A | | 10/1972 | Fork |
| 4,087,624 A | * | 5/1978 | Hitchcock ..................... 174/57 |
| 4,323,723 A | | 4/1982 | Fork et al. |
| 4,433,204 A | | 2/1984 | Wuertz |
| 4,842,156 A | * | 6/1989 | Nattel ......................... 220/3.9 |
| 5,257,487 A | | 11/1993 | Bantz et al. |
| 5,354,953 A | | 10/1994 | Nattel et al. |
| 5,378,854 A | | 1/1995 | Hoover |
| 5,486,650 A | | 1/1996 | Yetter |
| 5,574,256 A | | 11/1996 | Cottone |
| 5,594,207 A | | 1/1997 | Fabian et al. |
| 5,596,174 A | | 1/1997 | Sapienza |
| 5,598,998 A | | 2/1997 | Lynn |
| 5,655,827 A | | 8/1997 | Ridley et al. |
| 5,853,098 A | | 12/1998 | Elder |
| 5,939,671 A | * | 8/1999 | Gretz .......................... 174/50 |
| 6,091,023 A | * | 7/2000 | O'Donnell .................... 174/57 |

\* cited by examiner

*Primary Examiner*—Dean A. Reichard
*Assistant Examiner*—Angel R. Estrada

(57) ABSTRACT

A device housing assembly for an industry standard electrical device, such as a switch or power receptacle, and a control device for controlling the electrical device, the control device having both controlled connectors and controlling connectors. The device housing assembly comprises an electrical device housing, a control components enclosure, and a dividing/mounting plate. The electrical device housing has an opening in the bottom defining two side ledges, and the top having a first mounting element adjacent to the front opening for mounting the electrical device in the electrical device housing. The control components enclosure has a top opening with side walls bent over to form flanges along sides of the top opening and fits through the opening in the bottom of the electrical device housing so as to hang by the flanges from the side ledges. The plate completes the electrical device housing and provides a second electrical device mounting element so that the electrical device may not be mounted in the device housing assembly unless the plate is installed. An aperture in the plate is provided for mounting the control device to the underside of the plate so that the controlled connectors are accessible from the upper side of the plate and the controlling connectors are accessible from the underside of the plate.

19 Claims, 26 Drawing Sheets

ENCLOSURE FOR INTERFACING ELECTRICAL AND CONTROL OR COMMUNICATION DEVICES

This application is a Cont. of Ser. No. 09/046,370 filed Mar. 23, 1998, now U.S. Pat. No. 6,091,023.

FIELD OF THE INVENTION

This invention relates to the field of housings for electrical and control devices. More particularly, the present invention relates to a device housing assembly for both an electrical device, such as a switch or a receptacle, and a control device, such as a relay, for controlling the electrical device, the device housing assembly providing a barrier between high and low voltage wiring.

BACKGROUND OF THE INVENTION

In recent years there has been an increasing demand for apparatus for controlling electrical devices such as receptacles and switches from a remote source, such as a computer or a microcontroller as well as for means for determining whether a remote electrical appliance, such as a lamp, is on or off, and providing such information back to the computer or microcontroller. For example, remote control of a switch or receptacle can permit lights to be turned on or off in a programmed sequence. By use of remote control, the power available at a receptacle may be varied so that a lamp plugged into the receptacle may be dimmed from a remote source.

There are many uses for remotely controlled devices in the area of energy conservation. For example, by monitoring exhaust fans in a building to determine which fans are running, a computer can control the fan based upon the time of day or other information so that the fan does not run in an unoccupied building.

Conventionally, remote control of receptacles and switches has been accomplished by the use of radio or infra-red frequencies to pass information to and from electrical devices, such as receptacles or switches. The controlled device is manufactured with electronic components contained within the device. There are limitations to this type of device. Interference from other radio systems may cause devices to switch on or off unpredictably. Interference from neighboring electrical devices may cause unpredictable results. Infra-red requires a "line of sight" to the device and is therefore also limited.

Another system for remote control of electrical devices uses the AC power lines as a carrier and superimposes a controlling signal at a high frequency. This method also has limitations. For example, when lamps are switched on, this system may not be able to switch them off because the temperature change at the lamp may cause interference. Further, there are problems in trying to control fluorescent lamps with this system and discharge lamps or halogen lamps cannot be controlled.

The control systems discussed above all use manufactured modules providing an electrical receptacle into which the controlled device is plugged, the module in most cases plugged into an existing receptacle to receive power. These remotely controlled devices are surface mounted and may be unattractive to look at, expensive, and are provided in limited styles and colors, which may not match the decor of their surroundings.

It is desirable to provide a controlling system that makes use of existing receptacles and switches and which can control such devices while they are mounted within an electrical box in the normal manner with a cover plate flush with the surrounding wall surface. The installation would then appear to be an uncontrolled outlet or switch, but would be a safer installation as the controlled device could be switched off completely to provide child safety.

For many years there have been reliable systems for providing control of electrical devices by use of low voltage wiring and electronic control devices. When wiring is used to provide control there is less likelihood of interference and most if not all of the limitations of other systems discussed above are overcome. However, since electronic control devices operate at lower voltages than electrical devices such as receptacles, consideration must be given to several parts of electrical codes in existence in many countries which require:

1. When wiring from two systems having different voltages are present in an enclosure, these wires should be physically separate.
2. Wiring must be protected against mechanical damage.
3. Adequate space must be provided in a box which contains an electrical device.
4. A semiconductor device should not be relied upon as a disconnecting means.
5. Terminations for wiring of both systems must be accessible.

Disclosed in the prior technical literature are a number of enclosures for electrical and control devices. For example, Tashjian, U.S. Pat. No. 1,437,324 (Nov. 28, 1922) discloses a combined conduit, junction box and outlet box with a removable facepiece. The conduit/box is divided into high and low voltage portion by a permanent divider. No means for connecting a device in one portion with a device in the other portion is provided. Both portions are accessible when the facepiece is removed.

Haering, U.S. Pat. No. 1,829,648 (Oct. 27, 1931) discloses an electric receptacle baffle for dividing an electrical box into high and low voltage portions. No means for connecting a device in one portion with a device in the other portion is provided and both portions are accessible when the cover plate is removed.

Ohmit, U.S. Pat. No. 3,082,290 (Mar. 19, 1963) discloses a moveable floor-to-ceiling electrical installation for interior of a building comprised of a divided vertical conduit and a divided box joined to the conduit. The conduit and box are divided into high and low voltage portions. Again, no means are provided for connecting a device in one portion with a device in the other portion.

Ceglia, U.S. Pat. No. 3,146,298 (Aug. 25, 1964) discloses an electrical distribution system. Electrical boxes and a bus duct are provided with means for routing wiring from the bus duct to the boxes.

Fork, U.S. Pat. No. 3,701,837 (Oct. 31, 1972) discloses a multiple electrical service underfloor access housing. The housing is divided into portions for high and low voltage wiring with no means for interconnection.

Fork, et al., U.S. Pat. No. 4,323,723 (Apr. 6, 1982) discloses a surface mounted outlet unit with separate compartments with no means for interconnection between compartments.

Bantz et al., U.S. Pat. No. 5,257,487 (Nov. 2, 1993) discloses a floor box for in-floor activations in a concrete floor divided into separate compartments by a partition with no means for interconnection between compartments.

Nattel et al., U.S. Pat. No. 5,354,953 (Oct. 11, 1994) discloses a cable holding device for holding a telephone cable beside an electrical outlet box so that a modular telephone jack can be mount to a faceplate shared with an outlet in the electrical box, but the telephone cable and jack do not enter the electrical box. Again, there is no connection between the inside of the electrical box and the outside space in which the telephone jack is located.

Yetter, U.S. Pat. No. 5,486,650 (Jan. 23, 1996) discloses a partition for dividing a device box. Again, no means are provided for connecting a device in one compartment of the box with a device in the other compartment.

Cottone, U.S. Pat. No. 5,574,256 (Nov. 12, 1996) discloses a recessed transformer electrical outlet box with integral telephone line connection. A cover plate having a modular telephone jack is provided to cover the recessed electrical outlet, the idea being to hide a line voltage adaptor module associated with a cordless telephone base station. No means are provided for connecting the high voltage wiring in the inner compartment of the box with a low voltage device in the outer compartment.

Fabian et al., U.S. Pat. No. 5,594,207 (Jan. 14, 1997) discloses a self-locking divider plate for dividing an electrical box into physically isolated compartments. No means are provided for connecting high voltage wiring in one compartment of the box with a low voltage device in the other compartment.

Lynn, U.S. Pat. No. 5,598,998 (Feb. 4, 1997) discloses an electrical outlet box mounting bracket. The idea is a variant of the Nattel et al. device discussed above.

There is a need, not satisfied by known device housing assemblies for electrical and electronic control devices, for a simple, inexpensive, easy to install enclosure for electrical and electronic control devices that can be flush mounted in a wall and which complies with the requirements of electrical codes.

SUMMARY OF THE INVENTION

The present invention is directed in one aspect to providing a device housing assembly for housing an electrical device and mounting a control device in a manner that the high voltage electrical device is separated by a barrier from the low voltage device and so that the electrical device cannot be installed unless the barrier is installed.

The electrical device is of the type having a pair of spaced mounting elements for cooperating with screws or other fasteners and mounting elements on an electrical power outlet box to mount the electrical device to the box. The control device is of the type being connectable to controlled connectors that are connectable to the electrical device to enable electrical communication between the control device and electrical device. The control device is also connectable to controlling connectors that are connected at the other end to a low voltage signal source. When connected, the low voltage signal source transmits a signal to the control device, which prompts the control device to communicate with the electrical device to initiate a desired action.

The major components of the device housing assembly comprise an electrical device housing, a control device housing, and a dividing plate for separating the electrical device and the control device.

The electrical device housing has a first electrical device mounting element at the front of the housing, a front opening at the front of the housing large enough to pass the control device housing therethrough, and, a connector opening elsewhere on the housing large enough to pass controlling connectors therethrough, and preferably at least part of the control device housing therethrough. The connector opening is preferably at the bottom of the housing, but may also be at the top or the side. The connector opening may optionally have side ledges for contacting a pair of flanges optionally locatable on the control device housing.

The control device housing has an opening large enough to pass a control device therethrough. The control device housing has side walls that may be optionally bent over to form flanges along each side of the top opening for locating contact with the optional ledges of the electrical device housing. The outside dimensions of the control device housing are selected to allow the control device housing to be moved through the front opening of the electrical device housing and at least partly through the connector opening and into a position for mounting to the electrical device housing.

The divider plate for completing the electrical device housing comprises an exterior surface adapted for mounting to an offset plate attached to the control device or to the control device directly. The divider plate also has an aperture for passing the controlled connectors therethrough, and a second electrical device mounting element. There are mounting elements for mounting the divider plate to the electrical device housing, such that when mounted, the divider plate covers the connector opening thereby separating the control device and controlling connectors from the electrical device while providing access to the controlled connectors from inside the electrical device housing. When mounted, the divider plate also provides the assembly with a sufficient number of electrical device mounting elements to cooperate with the mounting elements on the electrical device, so that the electrical device can be securely mounted onto or inside the electrical device housing. By locating the second mounting element on the divider plate, the electrical device may not be mounted onto or into the device housing assembly unless the plate is installed.

Means are provided for mounting the electrical device housing to a joist or stud of a wall. Typically in new installations, the electrical device housing is mounted to a joist or stud. Then, low voltage controlling connectors are positioned such that one end is close to the connector opening of the electrical device housing. Then, drywall is installed to complete the wall, leaving an opening corresponding to the front opening of the electrical device housing. Then, the controlling connectors are connected to control device. The control device is then mounted in the control device housing, and the control device housing is mounted to the divider plate. Then, these components are passed through the front opening of the electrical device housing and partly through the connector opening until the divider plate is in place to be mounted to the electrical device housing. Once mounted, the second electrical device mounting element is in place, thereby permitting the electrical device to be securely mounted to the electrical device housing after a power supply and the controlled connectors are connected to the electrical device.

In another aspect, the present invention is directed to providing a housing for an electrical device and a control device for controlling the electrical device, the control device having both controlled connectors and controlling connectors. The housing comprises a body having an access opening for mounting the devices inside the housing and a pair of electrical device mounting elements adjacent the access opening for cooperating with the mounting elements of the electrical device so that the electrical device can be mounted inside the housing. The device housing assembly further comprises a removable divider installable within the body so as to divide the interior of the body into an electrical device compartment accessible from the access opening and a control device compartment. The divider is also provided with attachment elements for attaching the control device to the divider so that the controlled connections are accessible for connection to the electrical device while the controlling connections are accessible for connection in the control compartment.

In another aspect the present invention is directed to providing an housing for an electrical device and a control device for controlling the electrical device, the control device being connectable to both controlled connectors and controlling connectors. The housing comprises a body having a front opening for mounting the electrical device inside the body and one electrical device mounting element. A removable divider installable within the enclosure is provided so as to divide the interior of the body into a compartment to accommodate the mounted electrical device and a compartment to accommodate the control device. The divider has a second electrical device mounting element for attachment of the electrical device so that the electrical device may not be mounted in the body unless the divider is installed. The divider has attachment elements for attaching the control device to the divider so that the controlled connections are accessible for connection to the electrical device while the controlling connections are accessible for connection in the control compartment.

In yet another aspect the present invention is directed to providing a control device module for mounting to an electrical device housing. The electrical device housing is of the type having a front opening large enough to pass an electrical device therethrough, a connector opening for passing a controlled connector therethrough, and an insufficient number of mounting elements to mount the electrical device inside the housing. The module includes a housing for a control device of the type connnectable to a controlled connector and a controlling connector. There is an aperture in a wall of the control device housing for a controlling connector to pass therethrough into the module to connect to the control device, and an aperture in another wall of the control device housing for the controlled connector connected to the control device to pass therethrough out of the module. There is an electrical device mounting element on the housing, and mounting elements for mounting the module to the electrical device housing such that when mounted, the wall of the module having the controlled device aperture covers the connector opening of the electrical device housing thereby separating the control device and the controlling connector from the electrical device while providing accessibility to the controlled connectors from inside the electrical device housing for connection to the electrical device. When mounted, the module also provides the electrical device housing with a sufficient number of mounting elements to mount the electrical device inside the electrical device housing.

A number of optional modifications may be made to or additional elements added to the assembly described above. For example, the assembly may additionally include a clamping plate for clamping an electrical device cable against a back wall of the electrical device housing. The clamping plate includes fastening means for fastening the clamping plate to the inside of the electrical device housing. The clamping plate is installed near the top of the electrical device housing and the electrical device housing includes on each side wall a tang bendable inwards to secure the clamping plate in place.

The control device housing may be optionally mounted to the divider plate by means of a nipple and locknut for threading through a suitable sized divider plate aperture.

According to yet another aspect of the invention, there is provided an assembly for housing an electrical device of the type having two spaced mounting elements, and for mounting at least partly outside the housing, a control device for controlling the electrical device and connectable to both a controlling and a controlled connector. The assembly includes an electrical device housing having a front opening large enough to pass the electrical device therethrough; mounting elements on the front of the housing for cooperating with the electrical device mounting elements to mount the electrical device inside the housing; and, a connector opening for the controlled connectors and at least part of the control device to pass therethrough. The assembly also includes a divider plate having an interior surface and an opposed exterior surface adapted to mount the control device thereto, and an aperture for passing the controlled connectors therethrough. The assembly further includes mounting elements for mounting the divider plate to the housing such that when mounted with the divider plate interior surface facing inside the housing, the divider plate covers the connector aperture thereby separating the mounted control device and controlling connectors from the electrical device while providing access to the controlled connectors from within the housing. The assembly may optionally include mounting elements for mounting the assembly to a joist or stud. Preferably the control device housing is mounted to the bottom of the electrical device housing; however, the electrical device housing may be adapted to mount the control device to one of its other walls.

DETAILED DESCRIPTION OF THE PREFERRED EMBODIMENT

Figure 1:
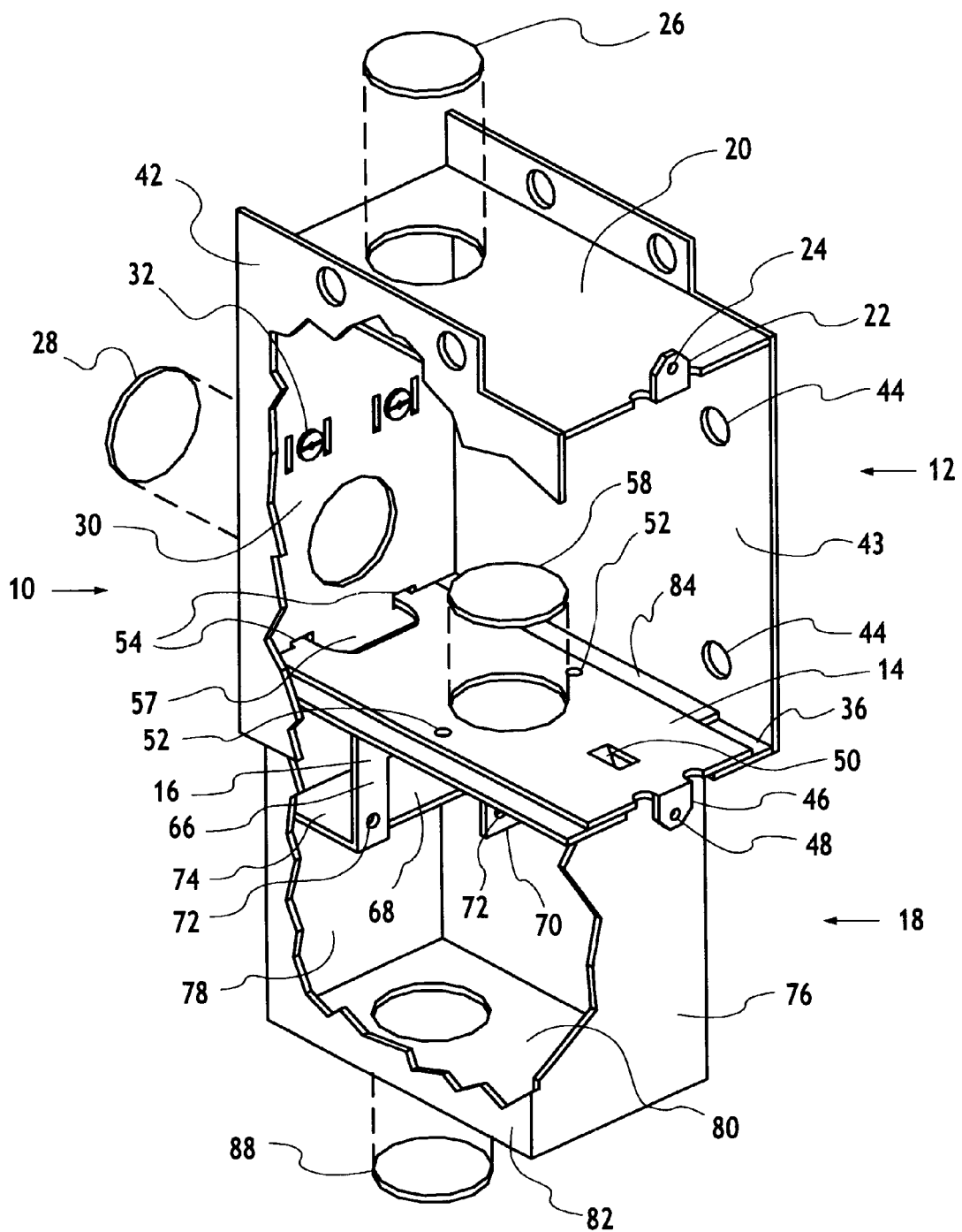
FIG. 1 is a schematic perspective view of a device housing assembly for electrical and control devices with a portion of a side exterior wall of the enclosure cut away, in accordance with a first embodiment of the invention.
Figure 2:
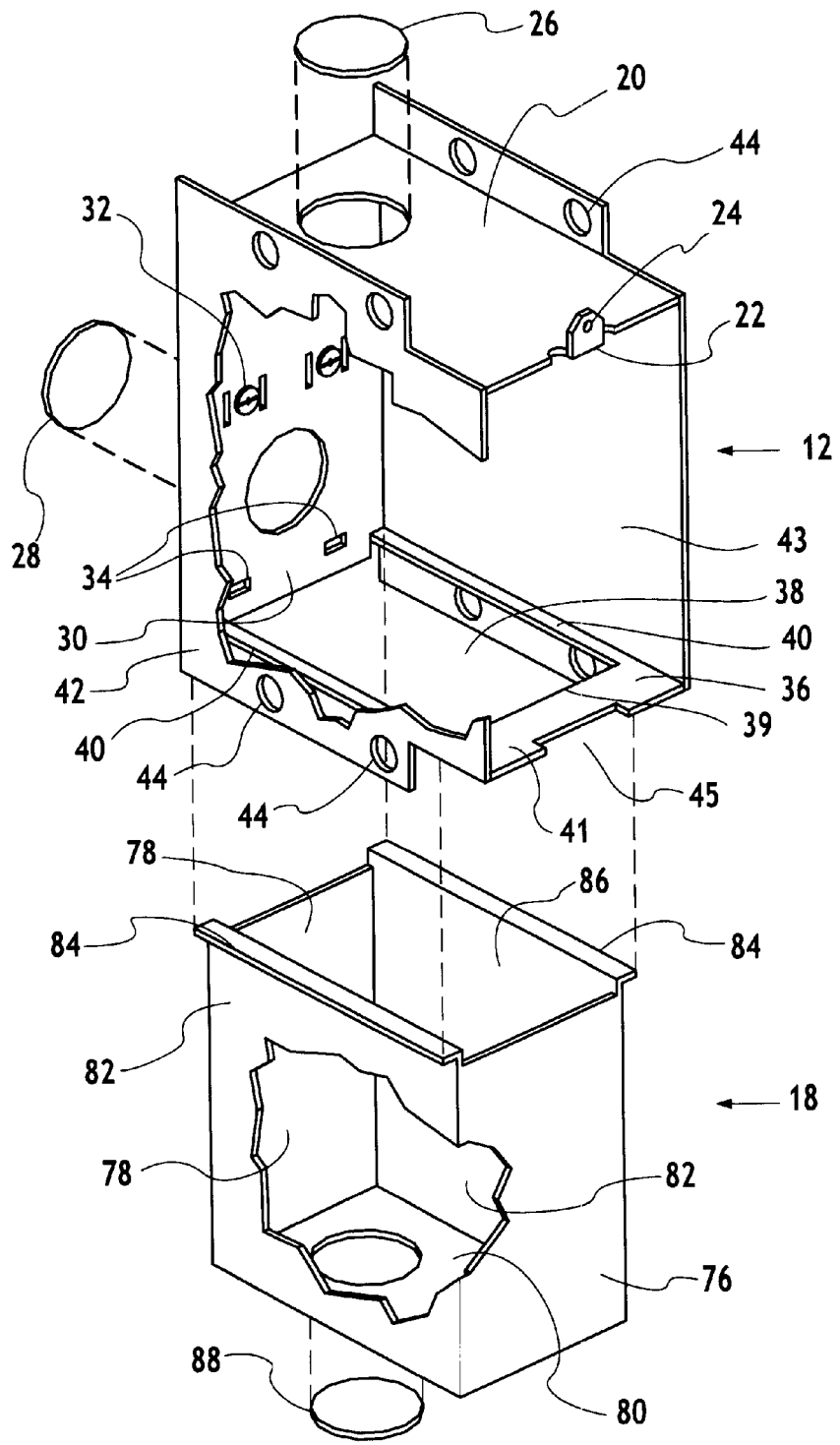
FIG. 2 is an exploded schematic perspective view of the device housing assembly of FIG. 1 with the dividing and offset plates removed.
Figure 3:
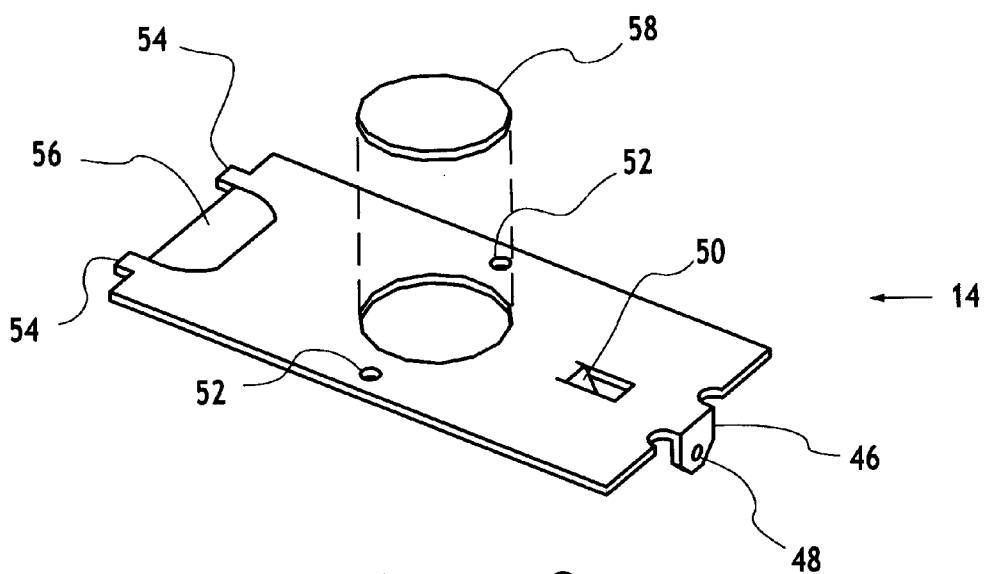
FIG. 3 is a schematic perspective view of the dividing plate of the device housing assembly of FIG. 1.
Figure 4:
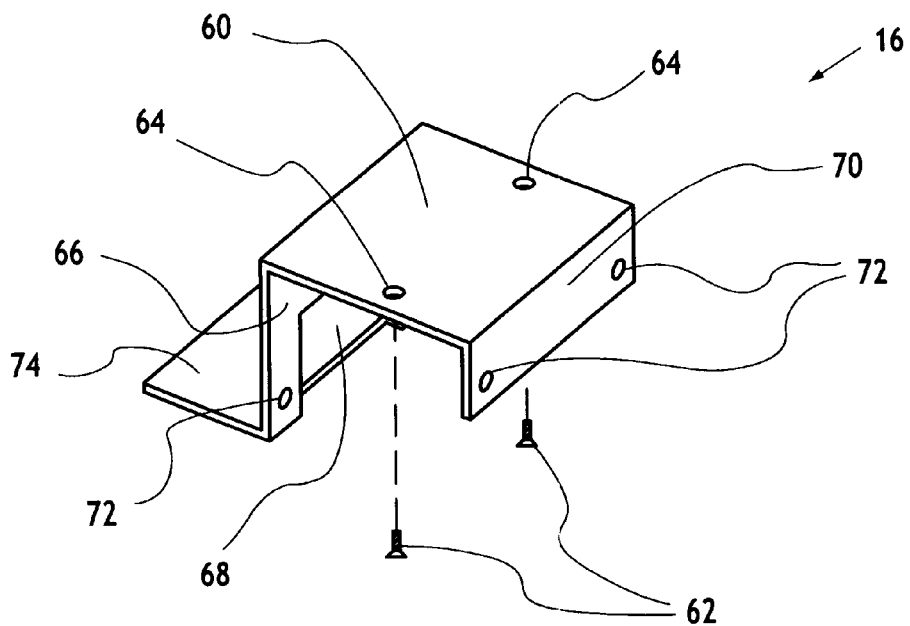
FIG. 4 is a schematic perspective view of the offset plate of the device housing assembly of FIG. 1.

FIG. 1 shows a first embodiment of an assembly for housing electrical (also referred to herein as high voltage, typically line voltage or higher) devices and mounting control or other low voltage devices in accordance with the present invention, generally indicated by numeral 10 and hereinafter referred to as "device housing assembly" for convenience. FIGS. 2, 3, and 4, show separately the main constituent elements of the device housing assembly 10, namely, an electrical device housing 12, a divider plate 14, an offset plate 16, and a control device housing 18. Although other suitable material such as plastic could be used, the electrical device housing 12, divider plate, and offset plate are preferably of cold rolled steel plate having a thickness of approximately 1/16" and the control device housing 18 is preferably of cold rolled steel plate having a thickness of approximately 1/20".

As illustrated in FIG. 2, the electrical device housing 12 generally resembles known rectangular electrical boxes of the kind commonly used to install electrical devices such as lights, switches and outlets. The electrical device housing 12 comprises a top wall 20, a back wall 30, a bottom wall 36, and side walls 42, the front edges of the top, bottom, and side wall defining a front opening 43. The top wall 20, back wall 30, and bottom wall 36 are formed in a conventional manner by bending a single metal sheet after the openings and cutouts described below have been made. The side walls 42 are generally flat metal sheets and are attached in the conventional manner to the top wall 20, back wall 30, and bottom wall 36. The front edge of the top wall 20 is provided with a first electrical device mounting element, namely an upturned mounting tab 22 with a hole 24 for receiving a screw (not shown) for mounting an electrical device to the electrical device housing 12. The top wall 20 is also provided with a circular knockout 26 for selectively punching out to receive electrical cable or conduit. Conventional means, such as a pry-outs and cable clamps (not shown) may be provided as well. The back wall 30 is provided with tapped holes (not shown) for grounding screws 32 and two slots 34, each having a height slightly greater than the thickness of the divider plate 14, and a circular knockout 28 for selectively punching out to receive electrical cable or conduit. The bottom wall 36 has a large rectangular opening 38 with a front edge 39. Surrounding the opening 38 are ledges 40 abutting the side walls 42 and a front frame portion 41 between the opening 38 and the front edge of the bottom wall 36. A portion of the front of front frame portion 41 is removed to provide a notch 45. Each side wall 42 is provided with openings 44 to receive means, such as screws (not shown), for mounting the device housing assembly 10.

The divider plate 14, which is shown in FIG. 3 separately from the assembled device housing assembly of FIG. 1, is provided with a second electrical device mounting element, namely a down turned mounting tab 46 having a hole 48 for receiving a screw (not shown) for mounting an electrical device (not shown) in conjunction with mounting tab 22 in the electrical device housing 12, a tang 50, tapped holes 52 for attaching the offset plate 16, and a circular knockout 58. The divider plate 14 as shown in FIG. 3 has tabs 54 and a partially sheared tab 56. The partially sheared tab 56 may be removed as shown in FIG. 1 to provide an opening 57 between the electrical device housing 12 and the control device housing 18 in the assembled device housing assembly 10, but may in some applications tab 56 be left in place if the circular knockout 58 is removed to provide means to connect devices in the electrical device housing 12 to devices in the control device housing 18.

The offset plate 16, which is shown in FIG. 4 separately from the assembled device housing assembly 10 of FIG. 1, is folded from a rectangular sheet of metal into four sections;

an attachment section 60, an aperture section 66, a control device mounting section 70, and a barrier section 74. The offset plate attachment section 60 is provided with openings 64 for offset plate attachment screws 62. Screws 62 are used to attach the offset plate 16 to the underside of the divider plate 14 using the tapped holes 52. An aperture 68 and tapped control device mounting holes 72 are provided in the aperture section 66.

The control device housing 18 is an open-topped box having a front wall 76, back wall 78, bottom wall 80, side walls 82, and an open top 86. The upper edges of the side walls 82 are turned-out to provide flanges 84 approximately equal in size to the ledges 40. The control device housing 18 is smaller in its outside dimensions that the inside dimensions of the electrical device housing 12 and has a rectangular horizontal outside cross-section closely matching that of the rectangular opening 38 so that the control device housing 18 may be slid into the rectangular opening 38 with minimal clearance. Circular knockouts 88 may also be provided in the walls 76, 78, 80, 82.

As will be apparent from the description above the device housing assembly 10 may be assembled by sliding the control device housing 18 into the rectangular opening 38 of the electrical device housing 12 until the flanges 84 rest upon the ledges 40. The divider plate 12 with the offset plate 14 attached is then moved into the interior of the electrical device housing 12 so that the tabs 54 enter the slots 34. The divider plate 14 is then pushed downward so that the divider plate 14 rests on the front frame portion 41 and the tang 50 enters the opening 38 and contacts the front edge 39 of the opening 38 to lock the divider plate 14 in place against front-to-back movement. The mounting tab 46 is accommodated by the notch 45 so that the front edge of the divider plate 12 is flush with the front edges of the side walls 42 and the top wall 20 which front edges define the front opening 43. Further, when an electrical device (not shown) is installed in the electrical device housing 12 using the mounting tabs 22 and 46, the electrical device itself bridges between the mounting tabs 22, 46 locking the divider plate 14 in place against vertical movement. The assembled device housing assembly is shown in FIGS. 5 and 6, the electrical device housing 12 providing mounting and cabling provisions for an electrical device equivalent to those of a conventional rectangular box.

Figure 5:
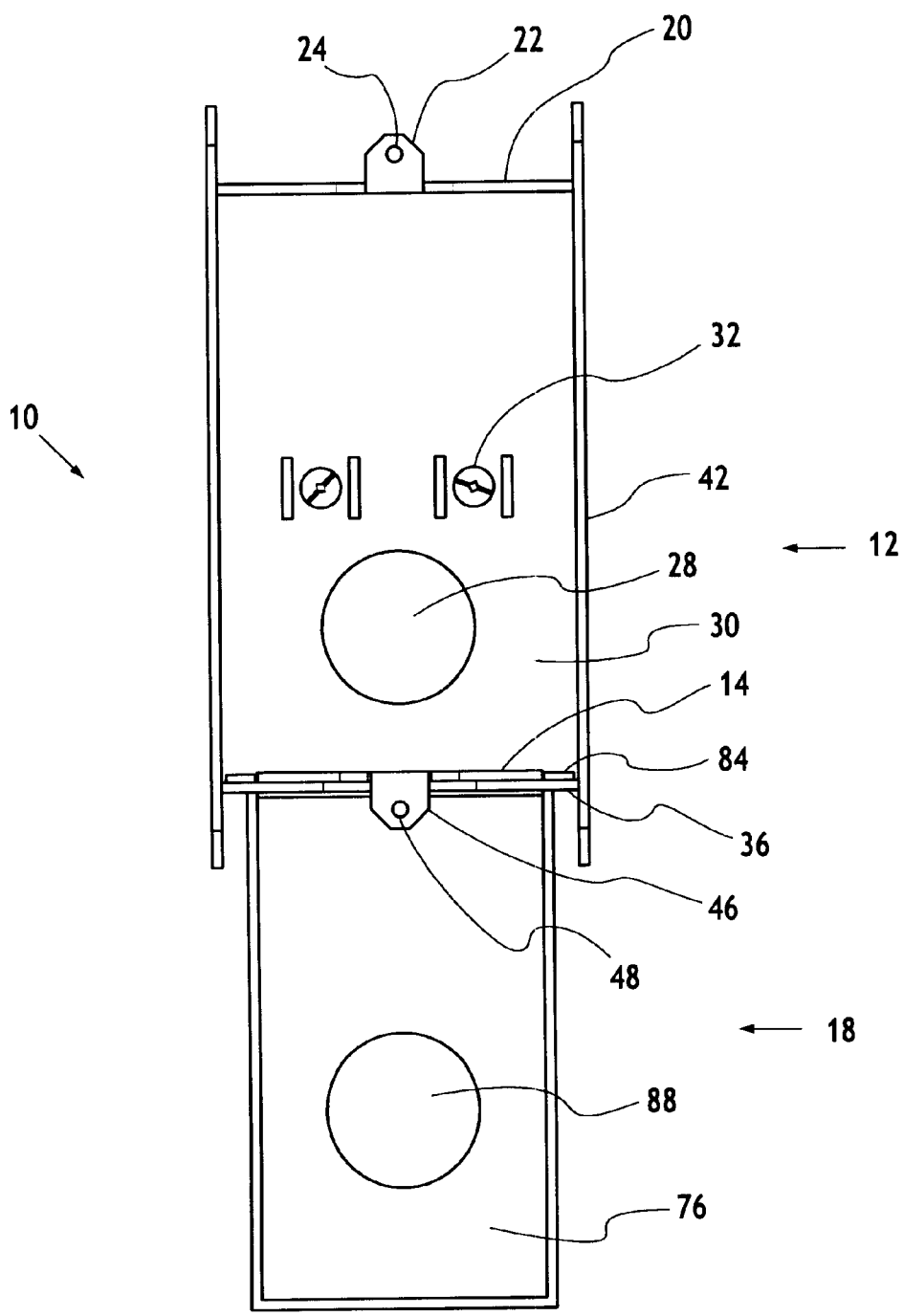
FIG. 5 is a schematic front elevation view of the device housing assembly of FIG. 1.
Figure 6:
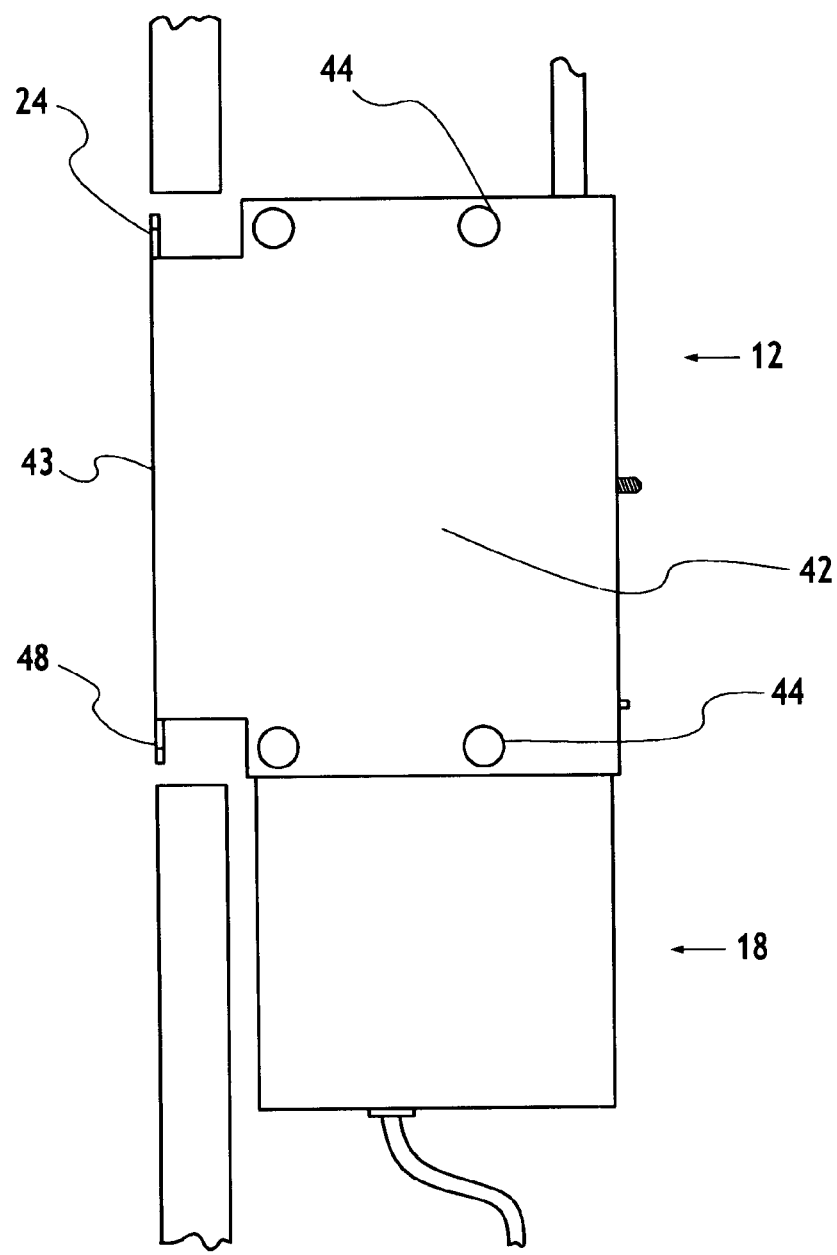
FIG. 6 is a schematic side elevation view of the device housing assembly of FIG. 1.

Because the mounting tab 46 is part of the divider plate 14, an electrical device cannot be mounted to mounting tabs 22, 46 unless the divider plate 14 is in place as shown in FIGS. 1 and 5, discouraging an installer from installing both control and electrical devices in the device housing assembly 10 without providing the divider plate 14 as a physical barrier as required by electrical codes.

Figure 7:
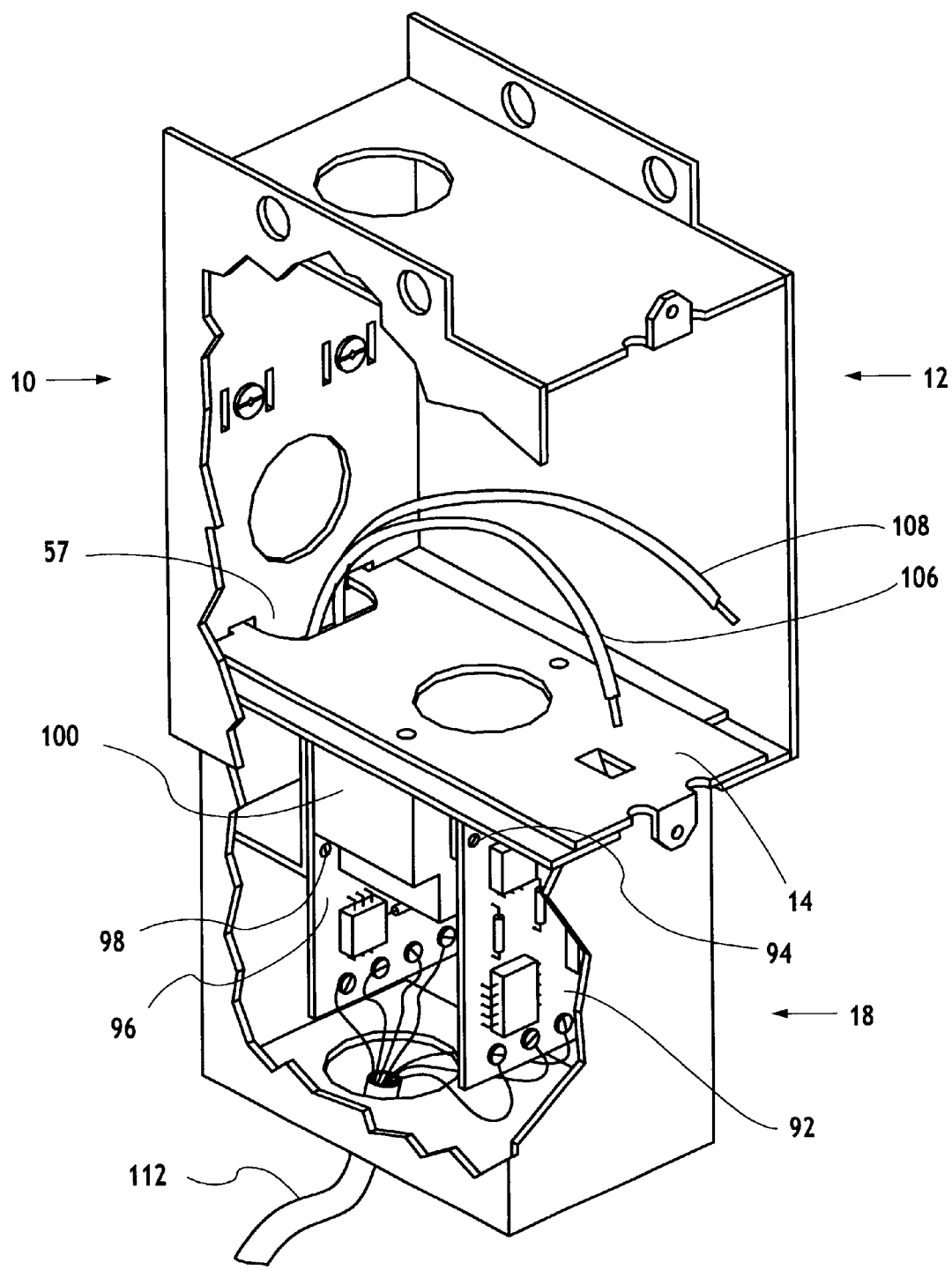
FIG. 7 is a schematic perspective view of the device housing assembly of FIG. 1 with a portion of a side exterior wall of the enclosure cut away to show control components installed therein.
Figure 8:
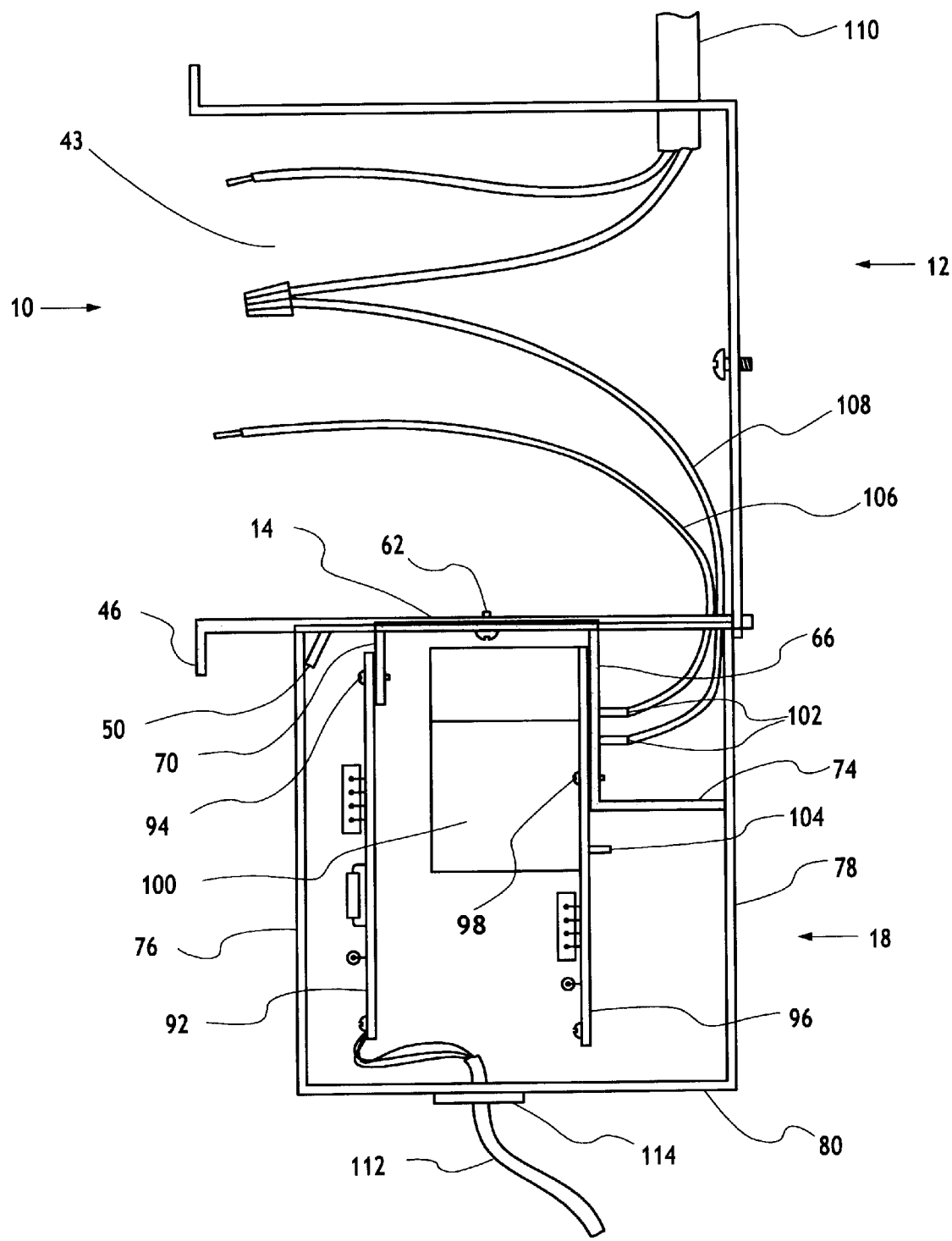
FIG. 8 is a schematic side elevation view showing control components mounted in the device housing assembly of FIG. 1, which is in cross-section.

FIGS. 7 and 8 illustrate a typical installation of a control device comprised of a relay and two circuit boards in the device housing assembly 10. One circuit board 92 is mounted with screws 94 to the control device mounting section 70 and a second circuit board 96 is mounted to the aperture section 66 with screws 98. In each case the screws 94, 98 are received by tapped control device mounting holes 72. A relay 100 of the Omron G8P series is shown mounted to the second circuit board 96 so that aperture 68 is covered by the relay 100 and controlled connection pins 102 of the relay 100 pass through aperture 66, while controlling connection pins 104 of the relay 100 are connected to the circuit board 96 inside the control device housing 18. Controlled connector wires 106 and 108, connected to the controlled connection pins 102, pass through the opening 57 in the barrier plate 14 into the electrical device housing 12. Wires 106 and 108 are then connected in series with a controlled electrical device (not shown), such as an outlet, to an electrical power cable 110, which also enters the electrical device housing 12. A controlling connector such as control signal cable 112, connected to the circuit boards 92, 96, enters the control device housing 18 through a controlling connector aperture 114 formed in the bottom wall 80 by the removal of the circular knockout 88.

Figure 9:
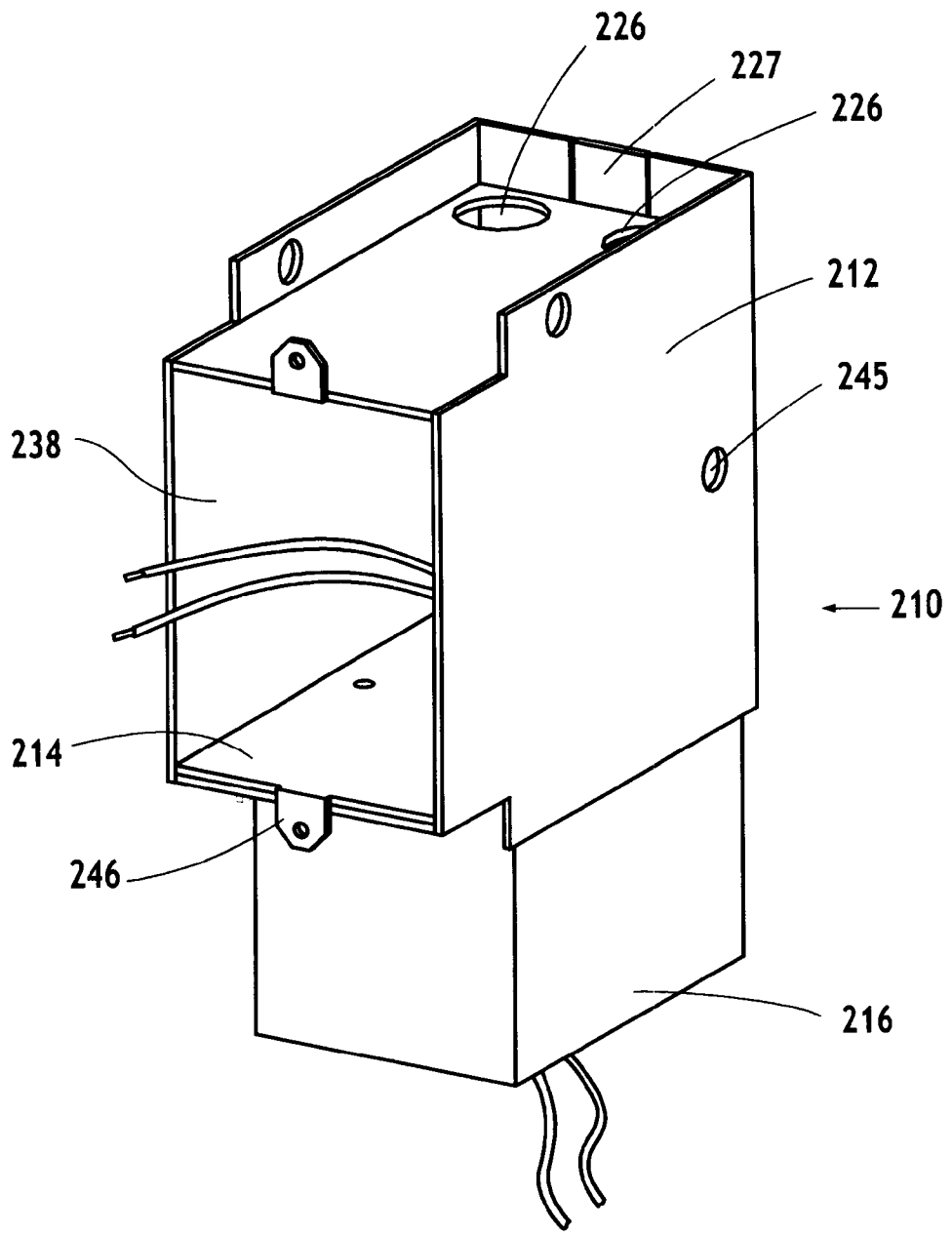
FIG. 9 is a schematic perspective view of a device housing assembly for electrical and control devices in accordance with a second embodiment of the invention.
Figure 10:
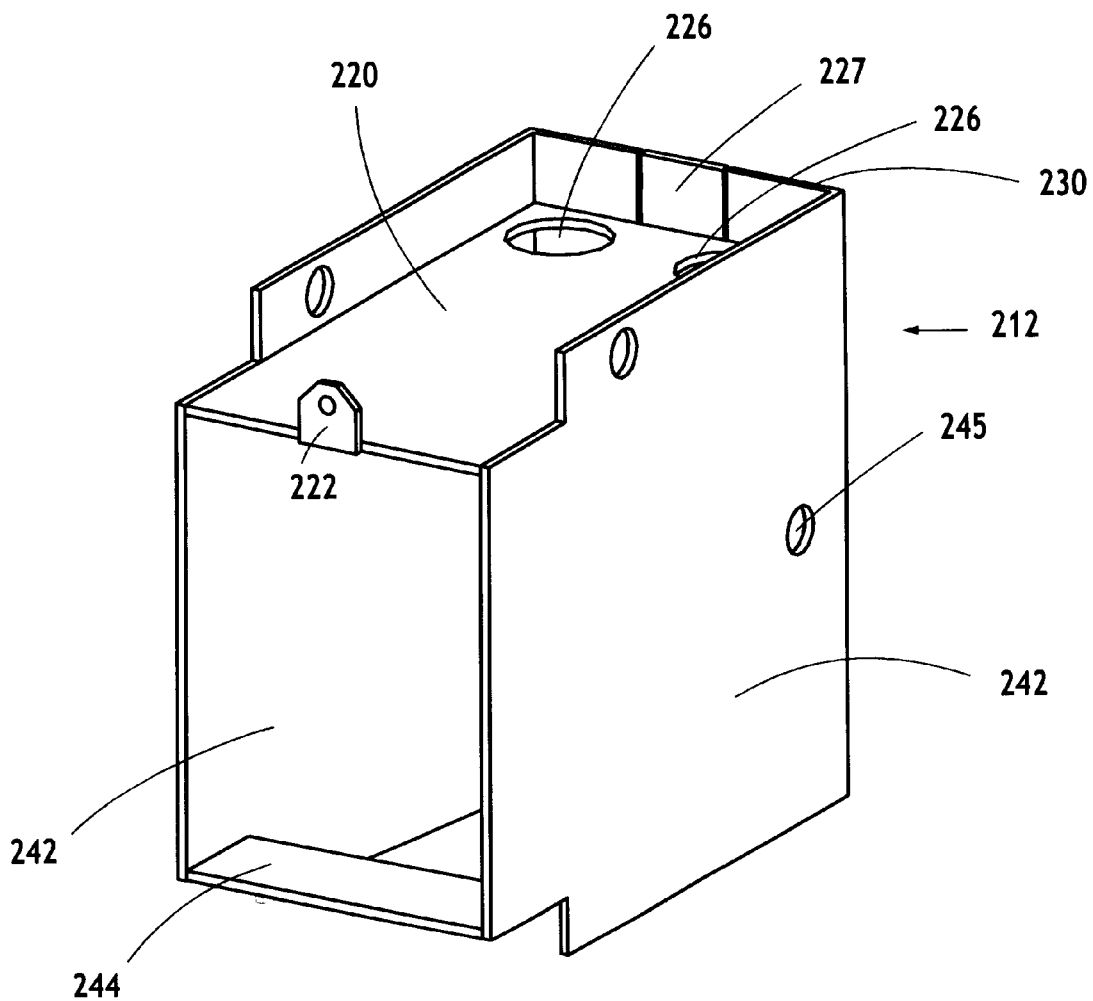
FIG. 10 is a schematic perspective view of an electrical device housing of the device housing assembly of FIG. 9.
Figure 11:
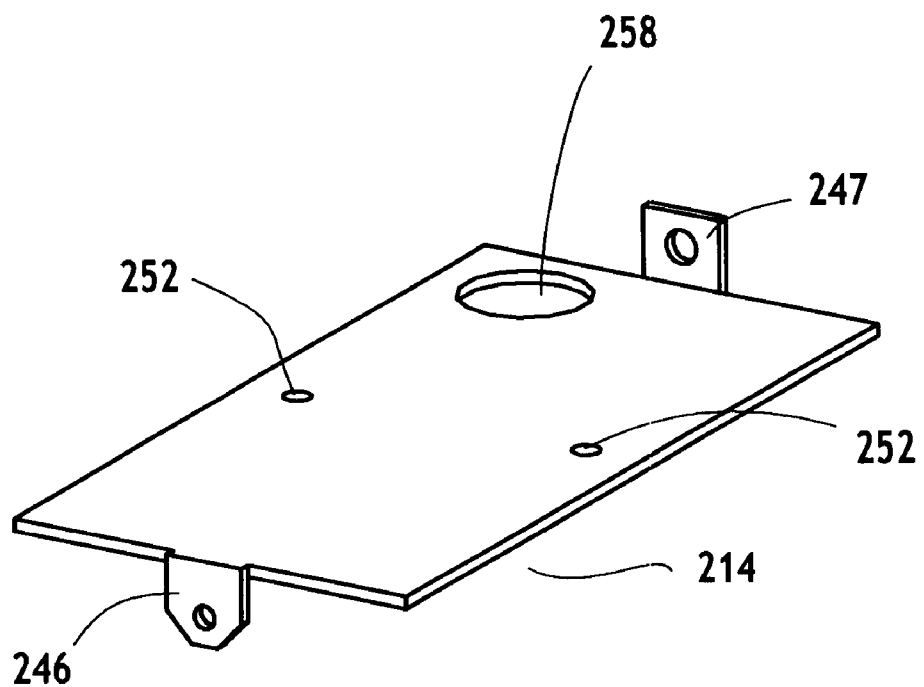
FIG. 11 is a schematic perspective view of a divider plate of the device housing assembly of FIG. 9.
Figure 12:
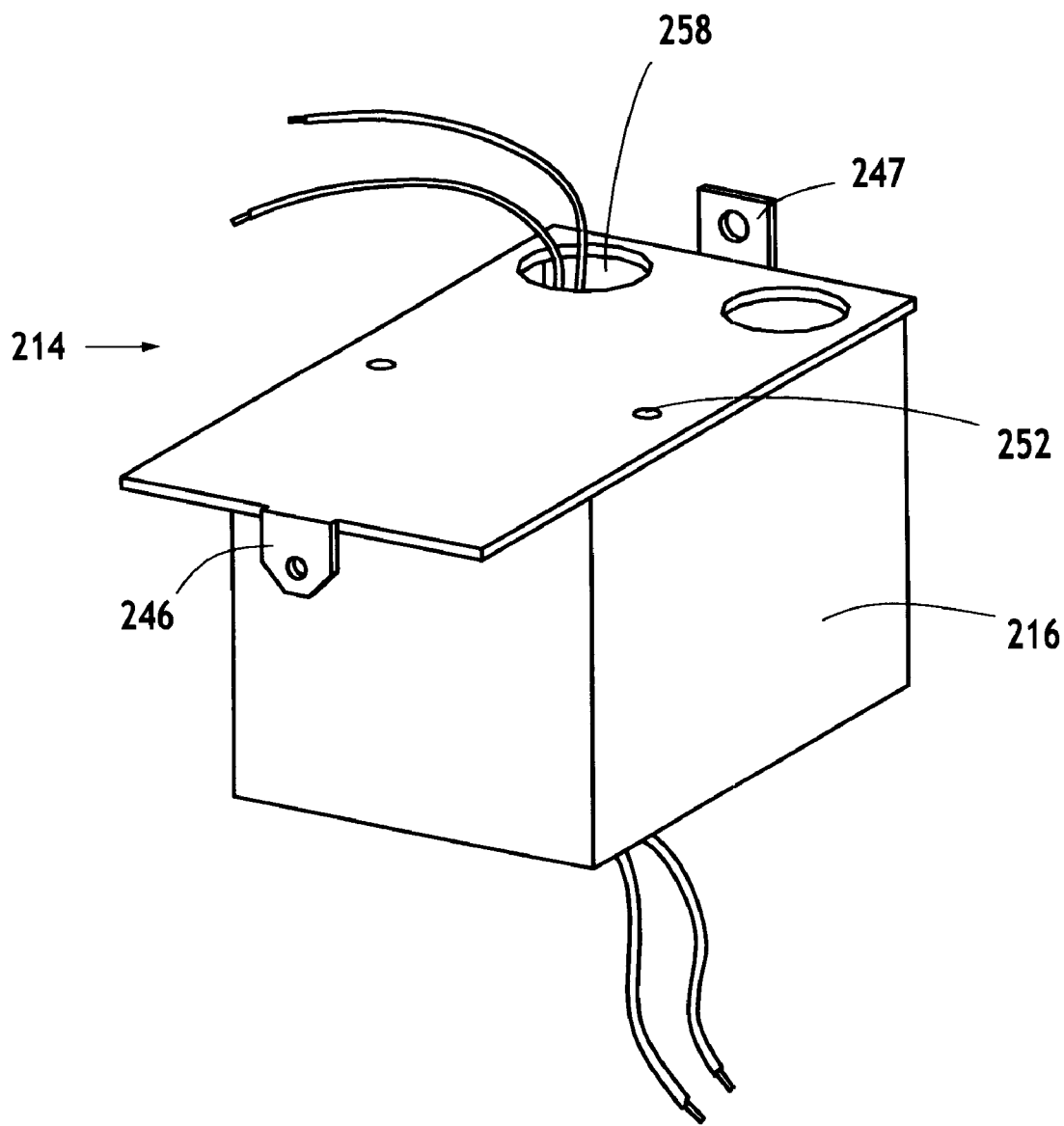
FIG. 12 is a schematic perspective view of the divider plate of FIG. 11 mounted to a control device housing of the device housing assembly of FIG. 9.
Figure 13:
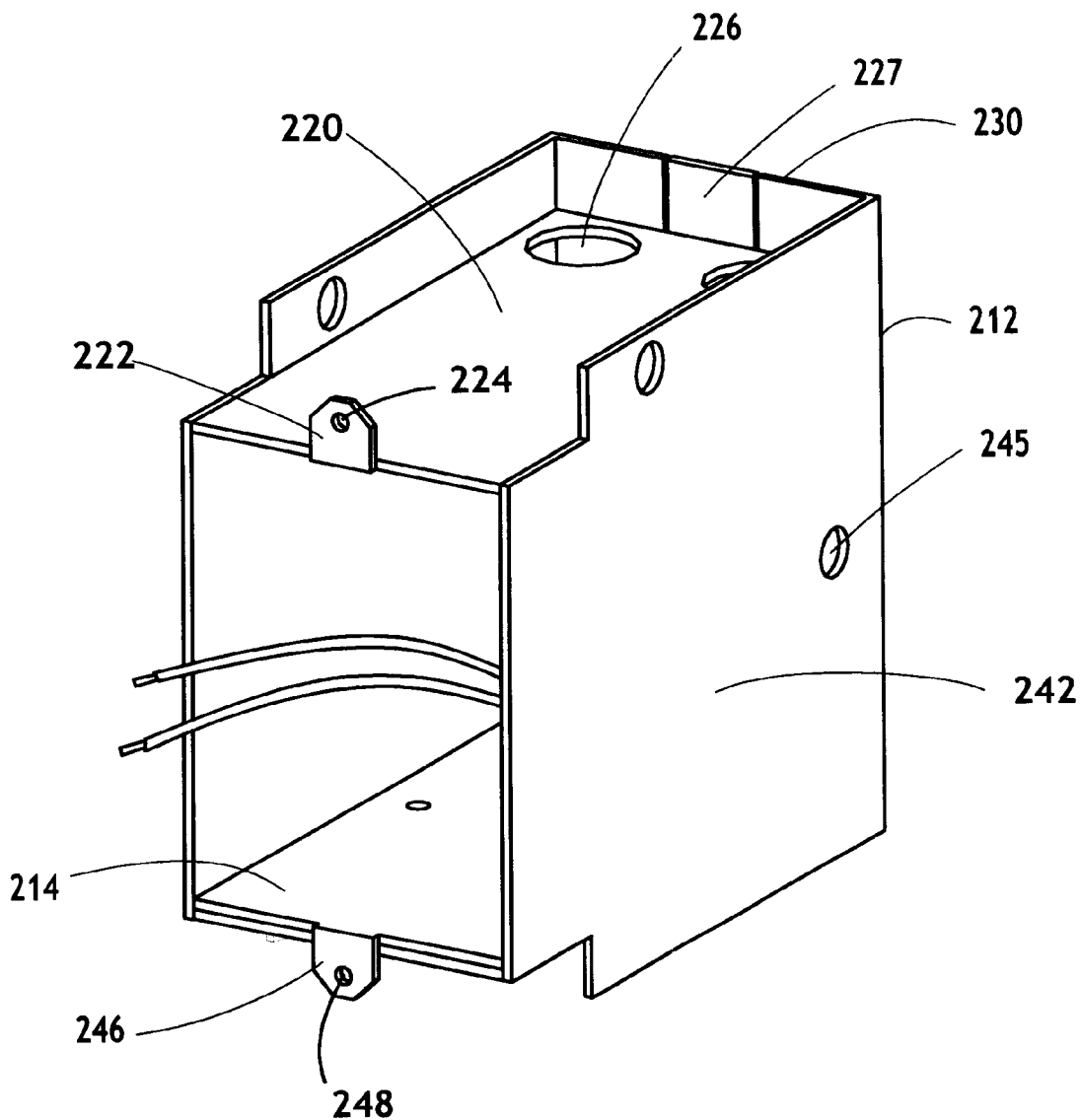
FIG. 13 is a schematic perspective view of the divider plate in FIG. 11 mounted on the electrical device housing of FIG. 10.

FIG. 9 shows a second embodiment of a device housing assembly 210. FIGS. 10 to 12 show separately the main constituent elements of the assembly 210, namely: an electrical device housing 212 in FIG. 10, a divider plate 214 in FIG. 11, and a control device housing 216 in FIG. 12. The preferred materials for the electrical device housing 212 and divider plate 214 are the same as in the first embodiment, namely, cold rolled steel plate having a thickness of approximately ¹⁄₁₆" for the divider plate and approximately ¹⁄₂₀" for the control device housing 216.

The electrical device housing 212 in the second embodiment is substantially similar to the first embodiment, the primary differences being:

a. Back wall 230 and side walls 242 are formed from one sheet of metal bent along suitable fold lines to form the respective walls;

b. Each side wall 242 is provided with openings 245 to receive means, such as screws (not shown), for mounting the assembly 210 to a joist or stud (not shown);

c. A top wall 220 is attached to the side walls by welding or another suitable conventional means of attachment, and is provided with two circular knockouts 226 for selectively punching out to receive electrical cable or conduit;

d. A tab 227 is located at the back of top wall 220, and is bendable into a position suitable for facilitating mounting of the top wall to the electrical device housing 212, e.g. by welding.

e. A bottom ledge 244 spans the front bottom of both side walls to provide structural integrity to the electrical device housing 212 and a place for the divider plate 214 to rest upon.

f. The mounting elements for mounting the divider plate 214 to the electrical device housing 212 comprise a mounting hole [not shown] on the back wall 210 of the electrical device housing, an apertured mounting tab 247 on the divider plate 214, and a screw or other suitable fastener.

Like the first embodiment, the front edge of the top wall 220 is provided with a first electrical device mounting element comprising an apertured upturned mounting tab 222 that cooperates with a screw (not shown) or other suitable fastener and the mounting element on the electrical device to mount the electrical device on or inside the electrical device housing 212. Suitable fasteners include spring clips or a hinge/screw combination, either on the electrical device or on the electrical device housing 212. As the electrical device has a pair of spaced mounting elements, it cannot be securely mounted to the assembly 210 until the second electrical device mounting element 246 on the divider plate 214 is in place. This ensures that any low voltage device is physically separated by the divider plate 214 before the higher voltage electrical device is mounted.

The divider plate 214, which is shown in FIG. 11 is substantially similar to the first embodiment, the primary differences being:

1. As discussed above, the mounting element for mounting the divider plate 214 to the electrical device housing 212 includes an upturned apertured mounting tab 247 at the back of the divider plate 214;

2. A circular knockout 258 is positioned off centre and near one end of the plate 214.

The divider plate 214 is provided with a second electrical device mounting element comprising an apertured mounting tab 246. When the divider plate 214 is mounted to the electrical device housing 212, the tab 246 cooperates with a screw (not shown) or like fastener and the second mounting element on the electrical device, to mount the electrical device inside the electrical device housing 212. The divider plate 214 also has mounting elements for mounting either the offset plate 16 with control device (not shown), or the a control device directly; suitable such mounting elements include tapped holes 252.

The control device housing 216 is illustrated attached to the divider plate 214 in FIG. 12. Unlike the first embodiment, the control device housing 216 has no flanges.

The device housing assembly 210 as illustrated is assembled by first attaching the offset plate 16 to a surface of the divider plate 214 ("exterior surface"). Then, a control device (not shown) is installed on the offset plate and the control device housing 216 is mounted to the divider plate 214. Alternatively, the control device may be mounted directly to the divider plate 214. Then, these joined components are slid through a front opening 238 of the electrical device housing 212 and passed through the a bottom opening 240 until the plate 214 rests on ledge 244 and the mounting elements for mounting the divider plate 214 to the electrical device housing 212 are in place for mounting.

When the assembly 210 is formed, the electrical device (not shown) may be installed in the electrical device housing 212. The electrical device itself bridges between the mounting tabs 222, 246 locking the divider plate 214 in place against vertical movement. As previously discussed, the electrical device cannot be mounted unless the divider plate 214 is in place as shown in FIG. 9, thus discouraging an installer from installing both control and electrical devices in the device housing assembly 10 without providing the divider plate 214 as a physical barrier as required by electrical codes.

Figure 14:
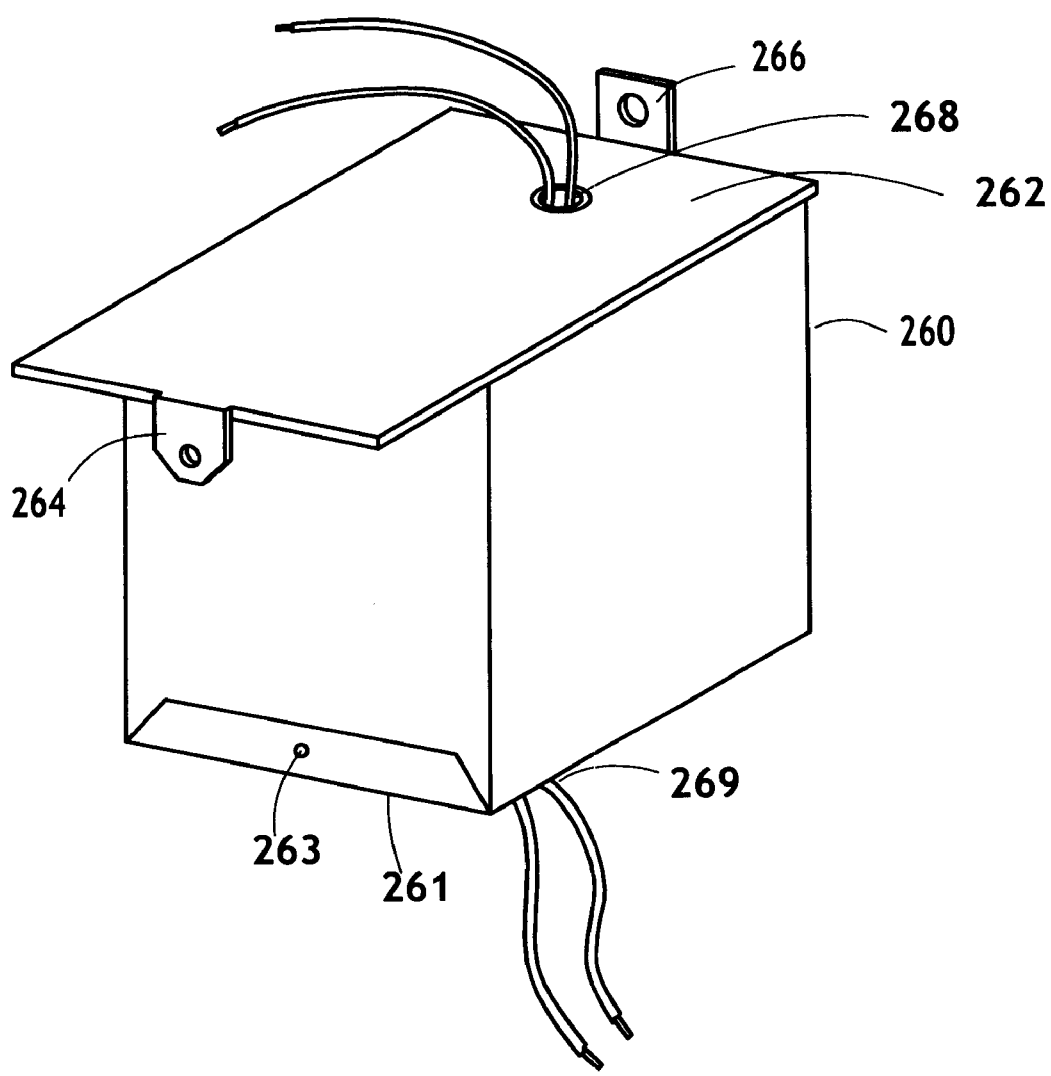
FIG. 14 is a schematic perspective view of a control device module for mounting to the electrical device housing of FIG. 10.
Figure 15:
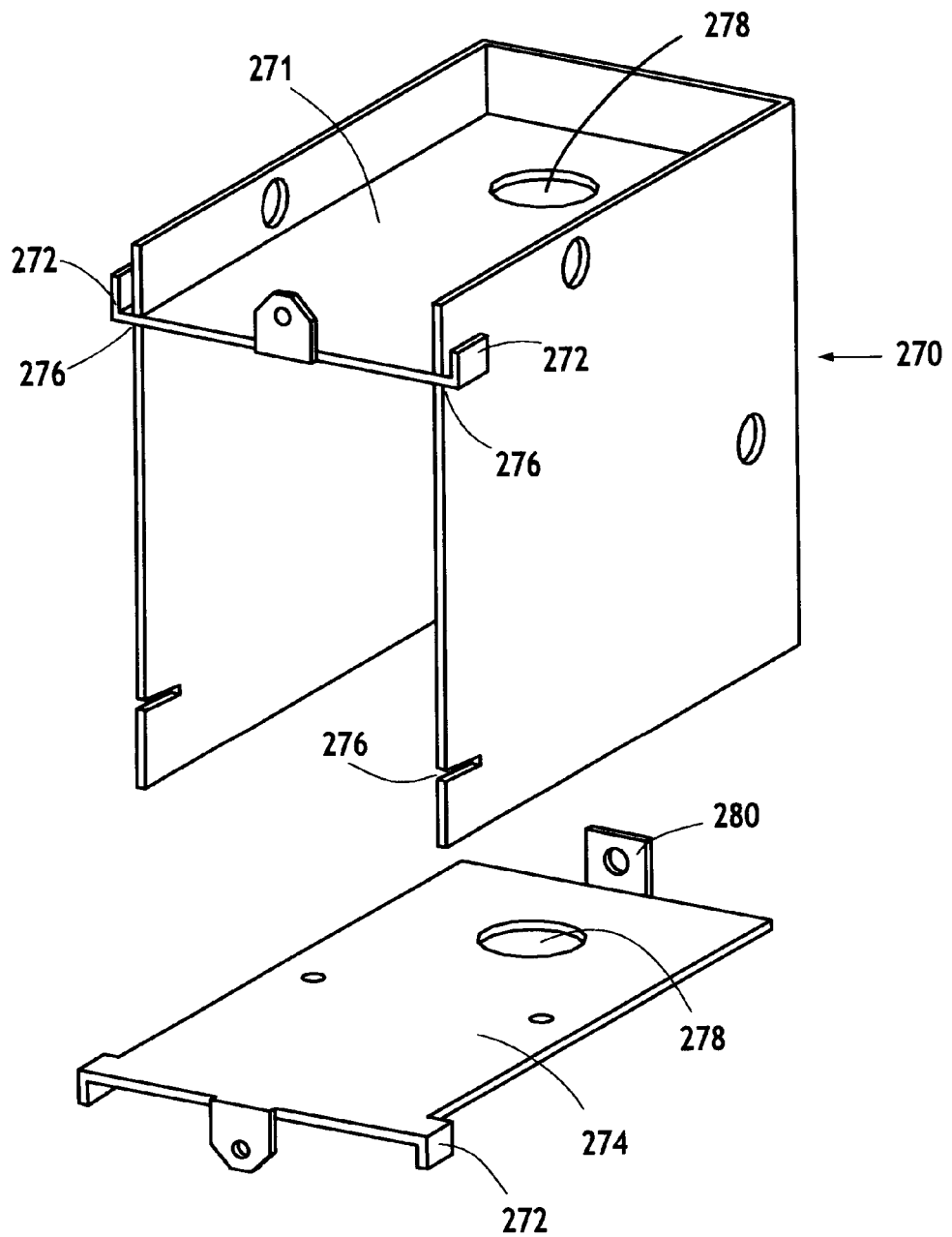
FIG. 15 is a schematic perspective view of a electrical device housing and a divider plate according to a third embodiment of the invention.

Referring to FIG. 14, a pre-assembled control device module 260 may be attached to the electrical device housing 212. The module 260 has a divider wall 262 welded or otherwise integrally joined to the module 260. A control device is placed inside the module 260 through an opening at the bottom, which is then closed by a cap 261 and secured by a rivet 263 or other suitable fastener. There is a second electrical device mounting element 264 and a housing mounting element 266 that cooperates with a screw or suitable fastener and the mounting element on the electrical device housing 212 to mount the module 260 in place. Controlled and controlling connectors protrude out of the module 260 through associated apertures 268, 269.

FIGS. 15–18 illustrate a third embodiment of the invention. The components of the device housing assembly are substantially identical the those in the second embodiment, except inter alia there are mounting elements for securing top wall 271 and divider plate 274 to the electrical device housing comprising tabs 272 and notches 276 on the housing 270 for cooperating with the tabs 272; note no ledge is provided like that in the second embodiment. Apertures 278 are provided on divider plate 274 for passing controlled connectors (not shown) or other electrical connectors therethrough. Mounting elements comprising an apertured tab 280 on divider plate 274, apertures in the back wall of the housing 270 and screws or other suitable fasteners facilitate the removable mounting of the divider plate 274 to the housing 270.

Figure 16:
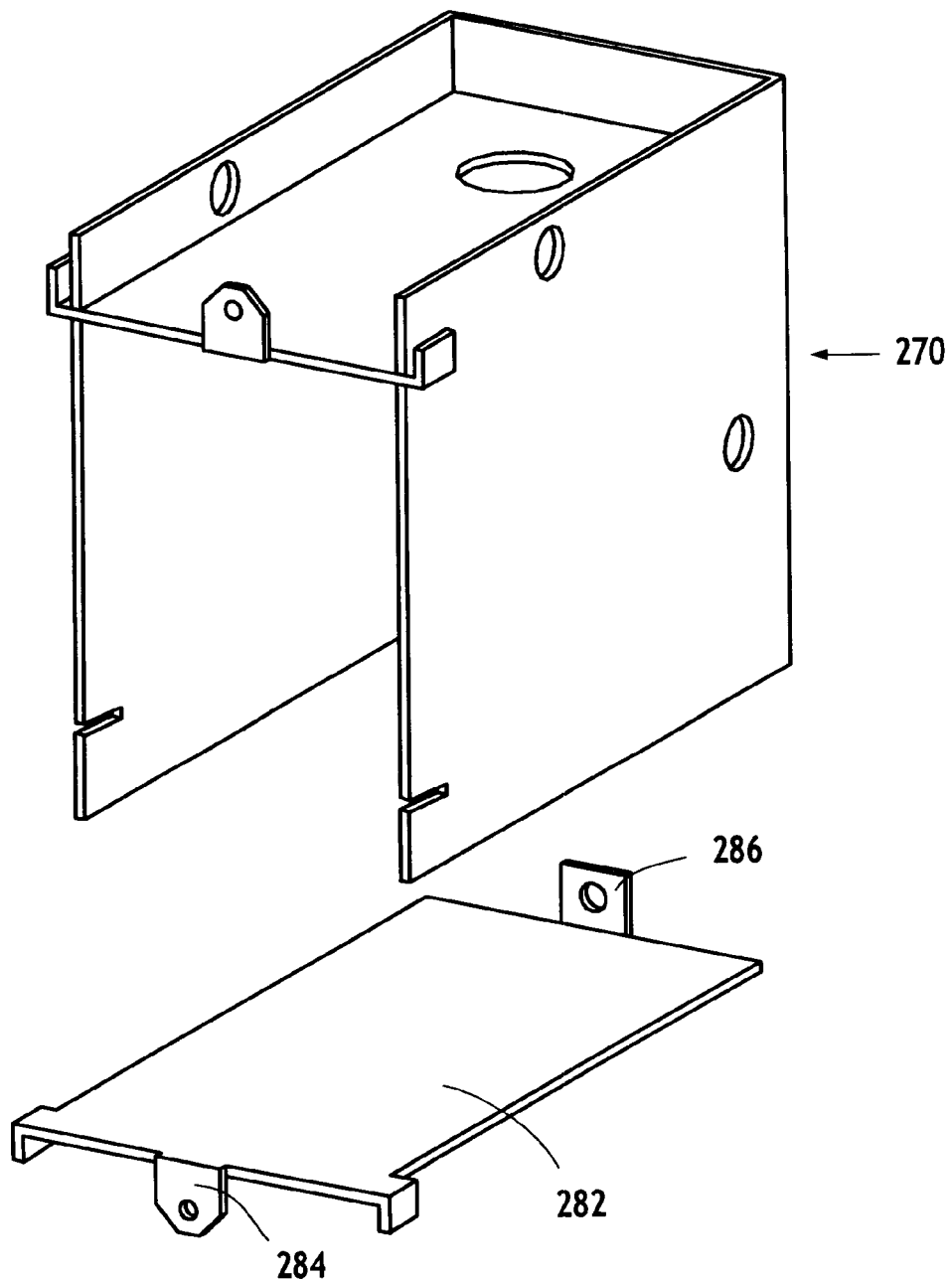
FIG. 16 is a schematic perspective view of the electrical device housing of FIG. 15 and a blank bottom cover.

Referring to FIG. 16, a blank covering plate 282 may be substituted in place of divider plate 274 if a control device is not to be mounted on the divider plate 274. Like the divider plate 274, the blank plate 282 has a second electrical device mounting element 284 and mounting elements for mounting the blank plate 282 to the housing 270.

Figure 17:
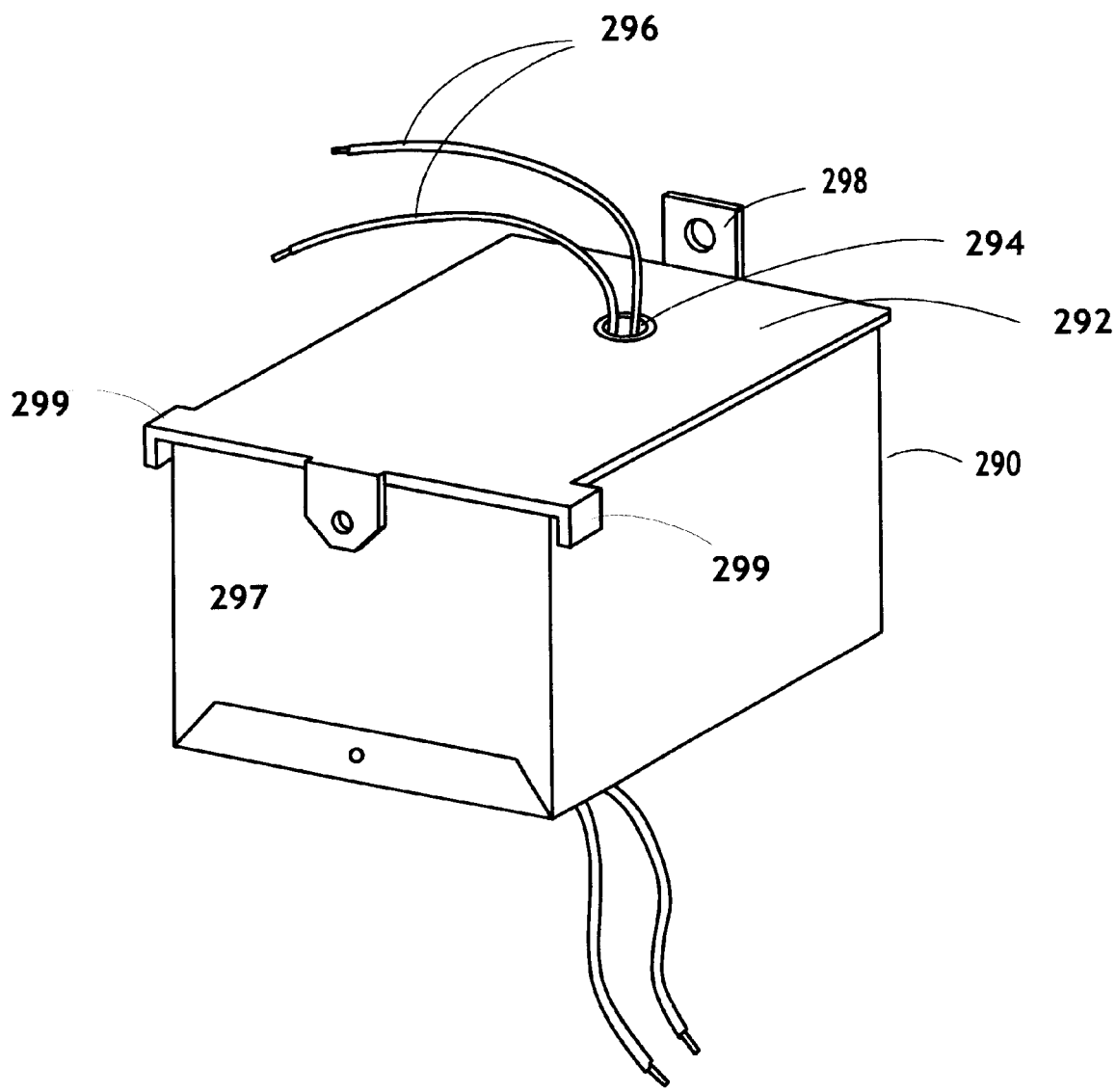
FIG. 17 is a schematic perspective view of control device module for mounting to the electrical device housing of FIG. 15.
Figure 18:
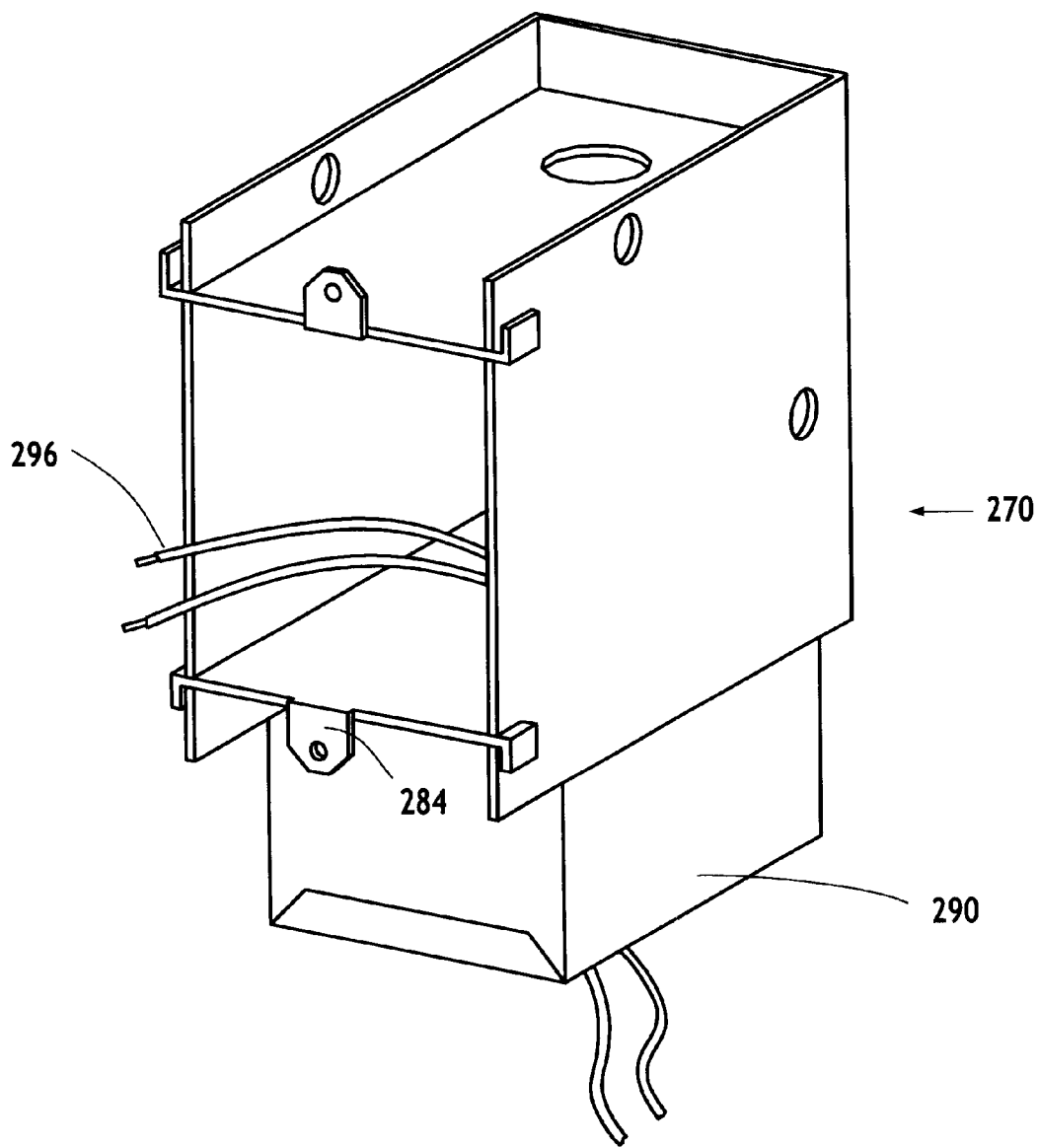
FIG. 18 is a schematic perspective view of the control device module of FIG. 17 mounted to the electrical device housing of FIG. 15.

Referring to FIG. 17, a pre-assembled module 290 may be attached to the housing 270. The module has a divider wall 292 with apertures 294 for passing controlled connectors 296 therethrough, a second electrical device mounting element 297 and mounting elements comprising an apertured tab 298 and lateral tabs 299 for mounting the module to the housing.

Figure 19:
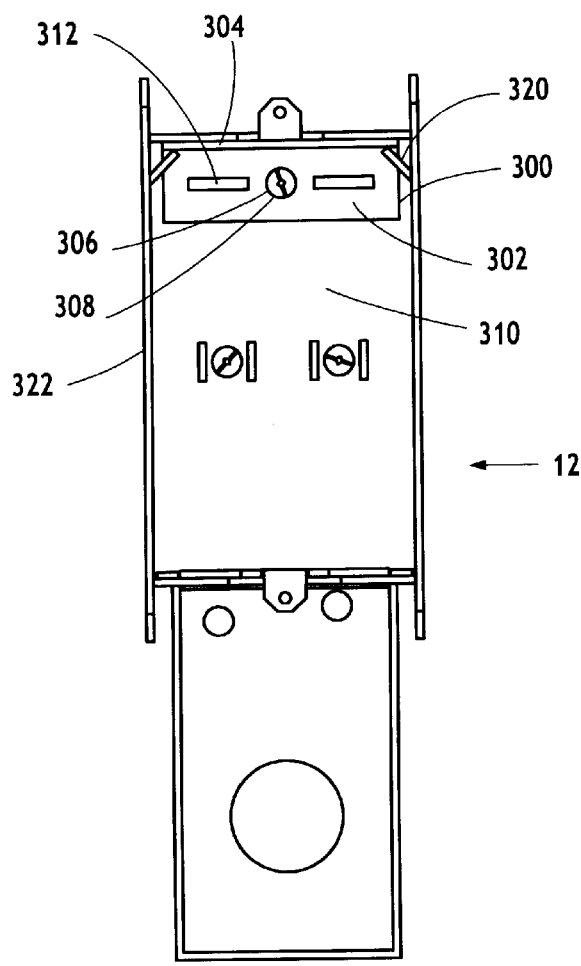
FIG. 19 is a schematic front view of a device housing assembly having a clamping plate installed therein in accordance with an alternative embodiment of the invention.

FIGS. 19–33 illustrate various alterative embodiments of the invention, being modifications of one or more of the embodiments of the device housing assembly described above:

Referring to FIG. 19, a clamping plate 300 for clamping electrical connectors such as non-metallic sheathed cable (not shown) is provided for use in any of the three embodiments of the device housing 12, 212, and 270. The clamping plate 300 is shown in FIG. 19 being attached to electrical device housing 12. The clamping plate 300 is L-shaped in profile having a short surface 302 and a long surface 304 perpendicular to the short surface 302. There are mounting elements comprising mounting hole 306 on the short surface 302, a mounting hole (not shown) on the back wall of the housing 12, and a screw 308 or other suitable fastener, for mounting the clamping plate 300 to the housing 12. Apertures (not shown) are provided on the long surface for passing the cable into the housing 12. The cables are clamped in place between the short surface 302 and the back wall 310; ribs 312 may be provided to assist in securing the cables in place. Tangs 320 may be provided on side walls 322 of the housing 12 that may be extended to hold the clamping plate 300 in place.

Figure 20:
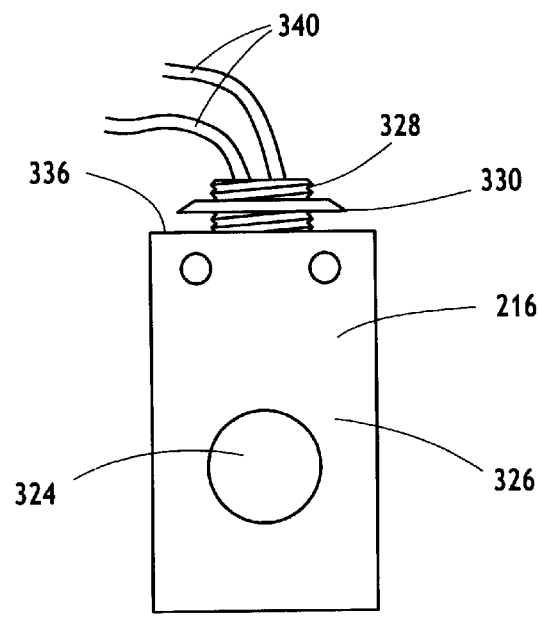
FIG. 20 is a schematic front view of a modified control device housing in accordance with an alternative embodiment of the invention.

Referring to FIG. 20, a modified control device housing is provided. The modification may be made to any of the first, second or third embodiments of the control device housing (the second embodiment is illustrated in FIG. 16). Control device housing 216 is modified to include a circular knock out 324 in its front wall 326, and a nipple 328 and a locknut 330 attached to and protruding from the top wall 336 of the control device housing 216. An aperture in a divider plate (not shown) is sized to receive the nipple 336 therethrough. Connectors 340 pass through an opening in the nipple 336 and into an electrical device housing (not shown) when the modified control device housing 216 is mounted.

Figure 21:
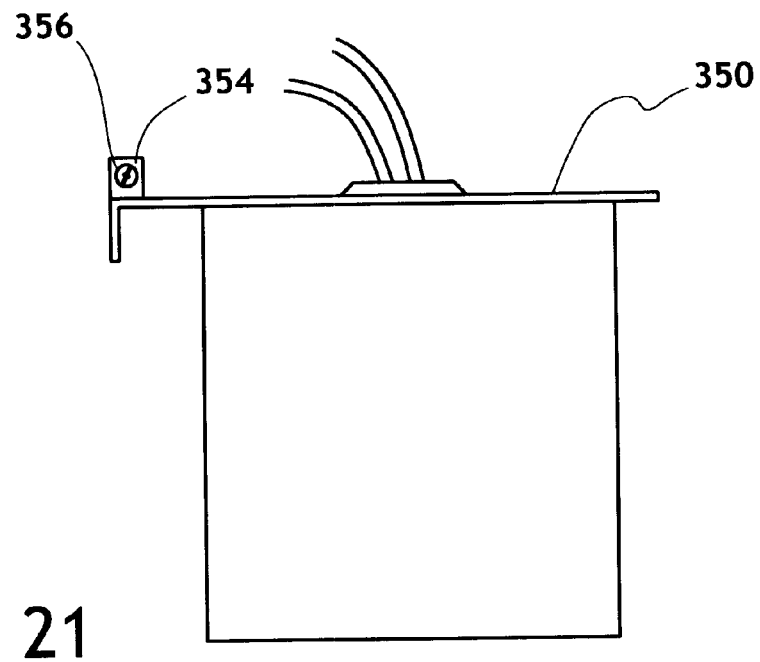
FIG. 21 is a schematic side view of a modified divider plate attached to a control device housing in accordance with an alternative embodiment of the invention.
Figure 25:
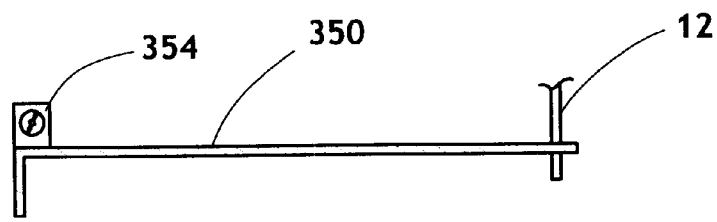
FIG. 25 is a side view of the modified divider plate illustrated in FIG. 21.
Figure 26:
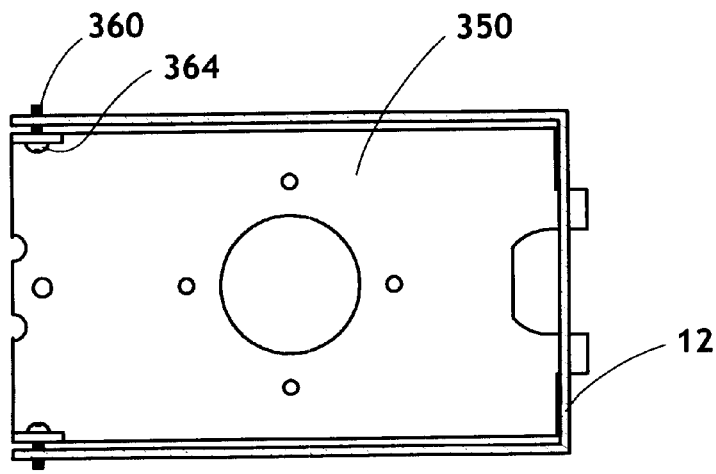
FIG. 26 is a plan view of the modified divider plate illustrated in FIG. 21.

Referring to FIGS. 21 and 25–26, there is shown a modified divider plate 350 (the figures shows the modification made to the first embodiment of the divider plate). On each front side edge of the modified divider plate 350 is an apertured mounting tab 354; when the divider plate 350 is positioned in place inside the electrical device housing 12, the divider plate side mounting tabs 354 are aligned with corresponding holes 360 in the housing 12 to enable a screw or like fastener to secure the divider plate 350 in place.

Figure 22:
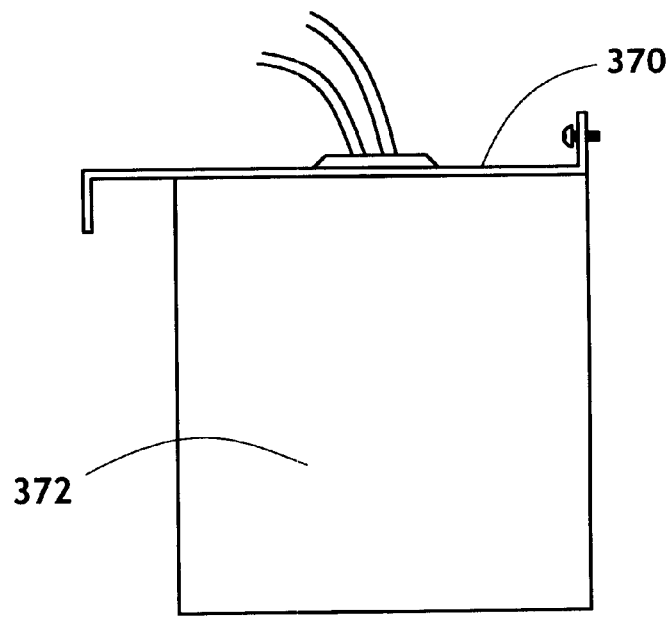
FIG. 22 is a side view of another modified divider plate attached to a control device housing in accordance with an alternative embodiment of the invention.
Figure 23:
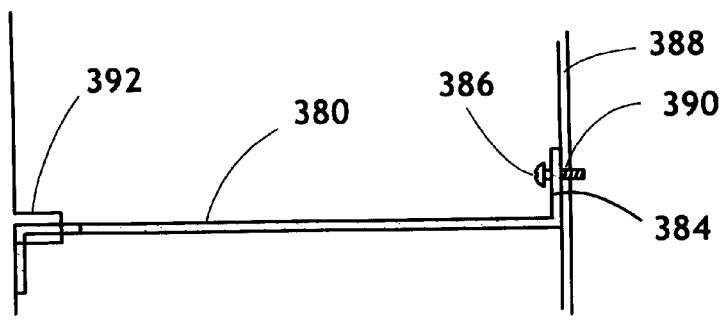
FIG. 23 is a side view of yet another modified divider plate in accordance with an alternative embodiment of the invention.
Figure 24:
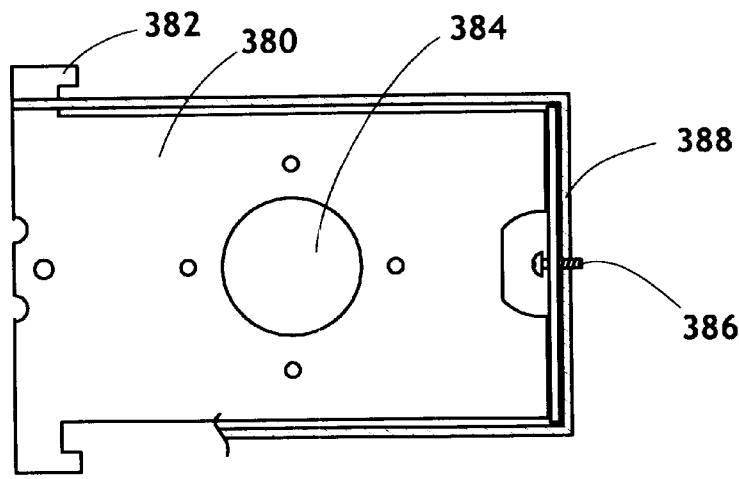
FIG. 24 is a plan view of the modified divider plate illustrated in FIG. 23.

Referring to FIG. 22, there is shown another modified divider plate 370 affixed to a control device housing 372. The control device housing mounting holes on the divider plate 370 are selectively located so that the back wall of the control device housing 372 aligns flush with the back edge of the divider plate 370.

Figure 27:
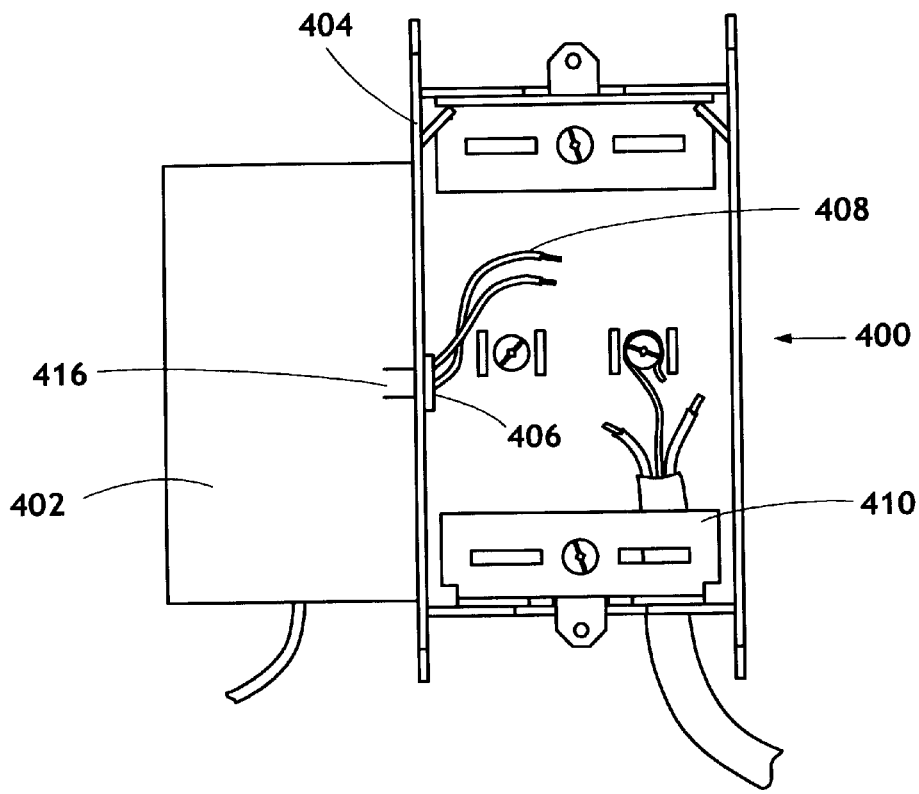
FIG. 27 is a front view of a housing assembly having a control device housing attached to the side of an electrical device housing in accordance with an alternative embodiment of the invention.
Figure 28:
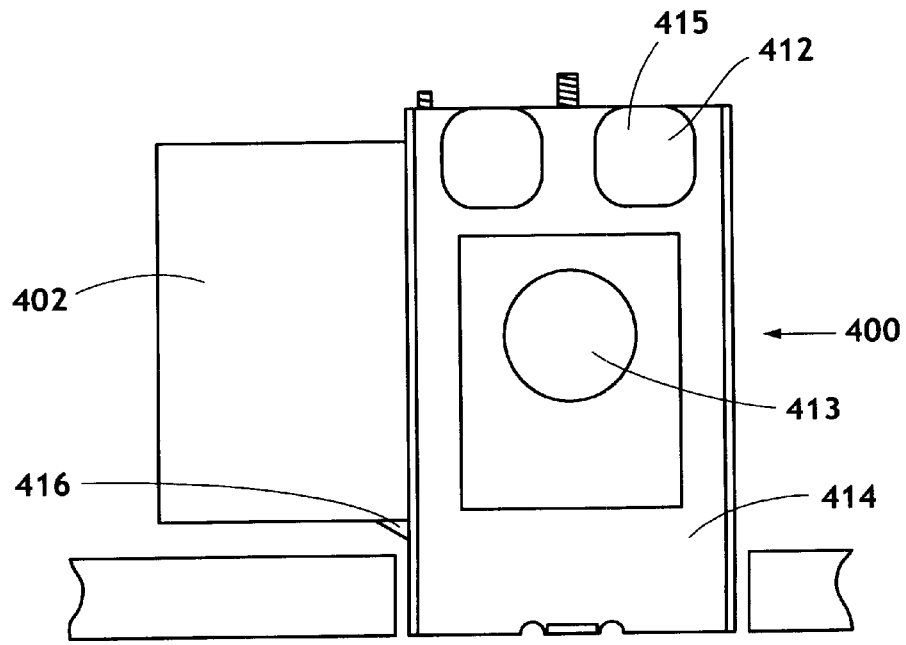
FIG. 28 is a plan view of the modified device housing assembly of FIG. 27.

Referring to FIGS. 27–28 there is shown an alternative electrical device housing 400 generally similar to the electrical device described in the previous embodiments, but adapted to mount a control device module 402 to a side wall 404 thereof. Housing side wall 404 has an aperture 406 for passing controlled wires 408 therethrough, and mounting elements comprising mounting apertures 409 for cooperating with a screw or like fastener (not shown) and mounting apertures (not shown) in the module 402 to mount the module 402 to the housing 400. The side wall 404 effectively serves as a divider plate for dividing low voltage devices in the control device housing 402 from high voltage devices in the electrical device housing 400. Note that any of the three embodiments of the housing 12, 212, 270 may be adapted; in this connection, multiple control devices may be mounted to the housing 400. Clamping plates 410 serve to clamp connectors (not shown) entering into the housing 400 through apertures 412, 413 on the top wall 414; the apertures 412 may be covered by removable tabs 415. Retaining clip 416 is provided for holding the control device module 402 in place.

Figure 29:
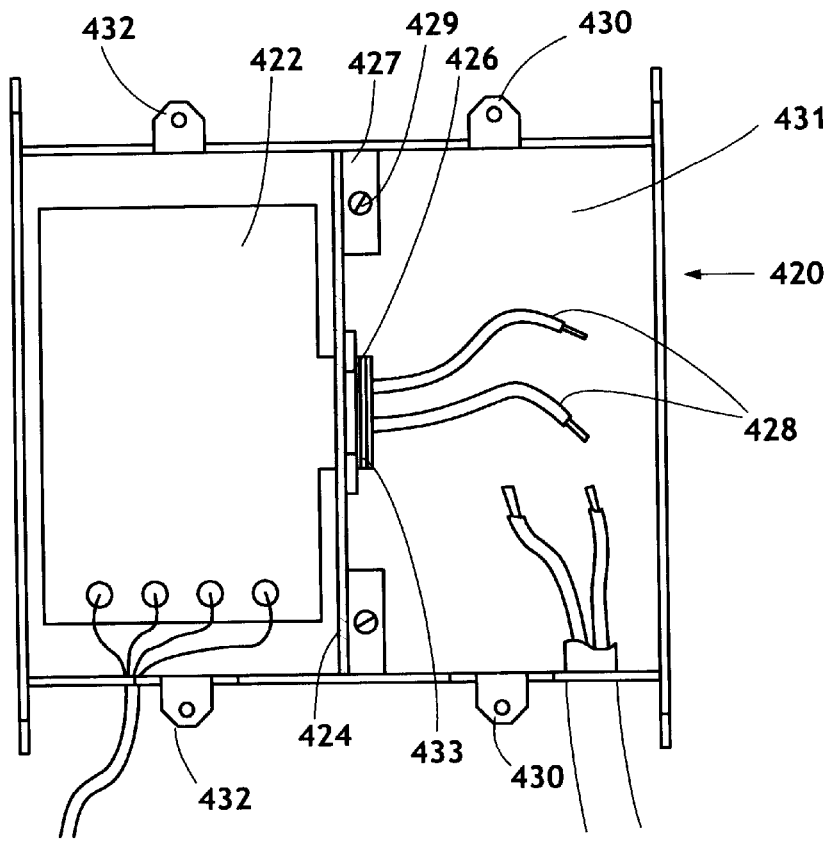
FIG. 29 is a front view of a two gang device housing assembly in accordance with an alternative embodiment of the invention.

Referring to FIG. 29, there is shown another alternative embodiment of an invention, namely, a two gang device housing assembly 420. The assembly 420 encloses both an electrical device (not shown) and a control device 422. A divider plate 424 separates the housing into two compartments. The divider plate is provided with aperture 426 for passing controlled wires 428 therethrough, and with mounting tabs 427 for receiving fasteners 429 to mount the divider plate 424 to the back wall 431 of the device housing assembly 420. A nipple and locknut 433 are provided to facilitate attachment of the control device 422 to the divider plate 424. Two sets of electrical device mounting elements 430, 432 are provided; the electrical device is mounted in the compartment not occupied by the control device 422, and a cover plate (not shown) is provided for covering the compartment occupied by the control device 422. It is understood that the control device and electrical device are locatable in either compartment.

Figure 30:
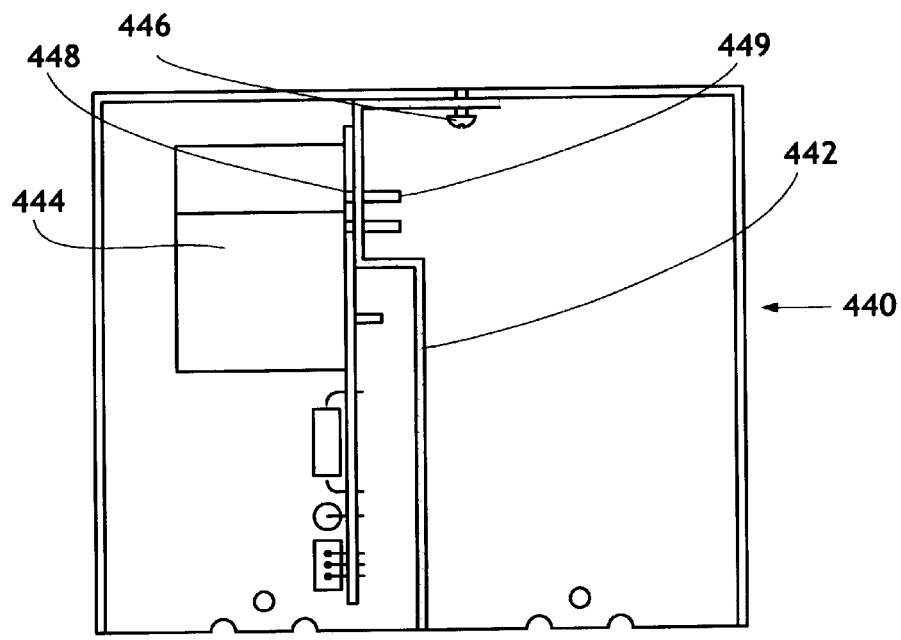
FIG. 30, is a plan view of another two gang device housing assembly having a modified divider and offset plate in accordance with an alternative embodiment of the invention.

Referring to FIG. 30, there is shown a two gang device housing assembly 440 having a divider plate 442 bent so that in addition to physically separating the circuit board 444 or other low voltage control devices from the high voltage electrical devices (not shown), it serves the function of the offset plate 16 as described in the first embodiment. The divider plate has mounting elements 446 for mounting the divider plate to the device housing assembly, and an aperture 448 for passage of controlled wires (not shown) therethrough, or, if the low voltage device is a circuit board, for passage of pins 449 of the circuit board therethrough.

Figure 31:
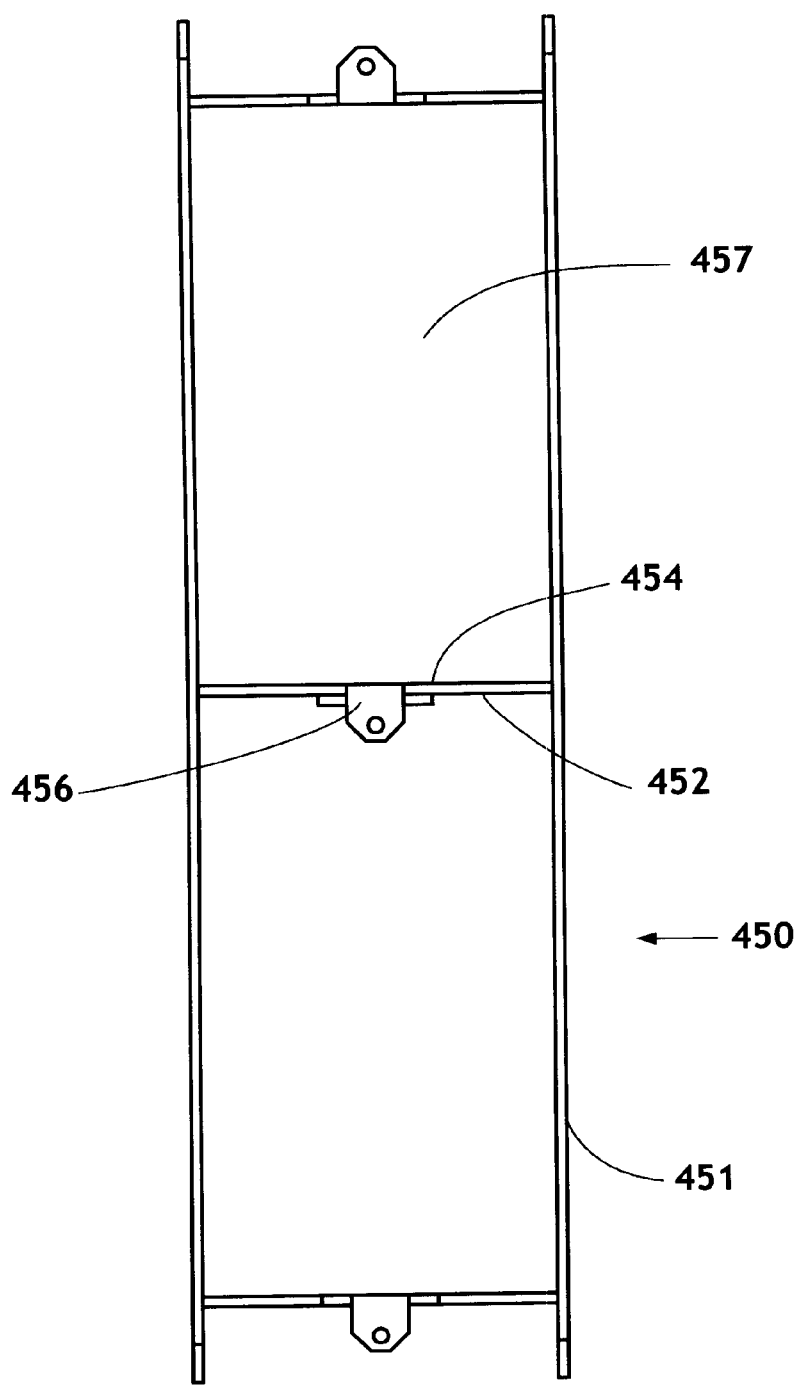
FIG. 31 is a front view of an elongated single enclosure for enclosing an electrical device and a control device in accordance with an alternative embodiment of the invention.

Referring to FIG. 31, there is shown an alternative device housing assembly 450 having a housing 451 for enclosing both an electrical device (not shown) and a control device (not shown). A divider plate 452 is provided for dividing the housing 451 into two compartments and has an aperture 454 adapted to receive a threaded nipple and locknut of the control device, and a second electrical device mounting element 456. The aperture 454 also enables the passage of controlled connectors therethrough. After the divider plate is in place, the assembly 450 is provided with a sufficient number of mounting elements to mount the electrical device thereto. A cover plate (not shown) may be installed over the electrical device to cover the portion of the housing front opening 457 not occupied by the electrical device.

Figure 32:
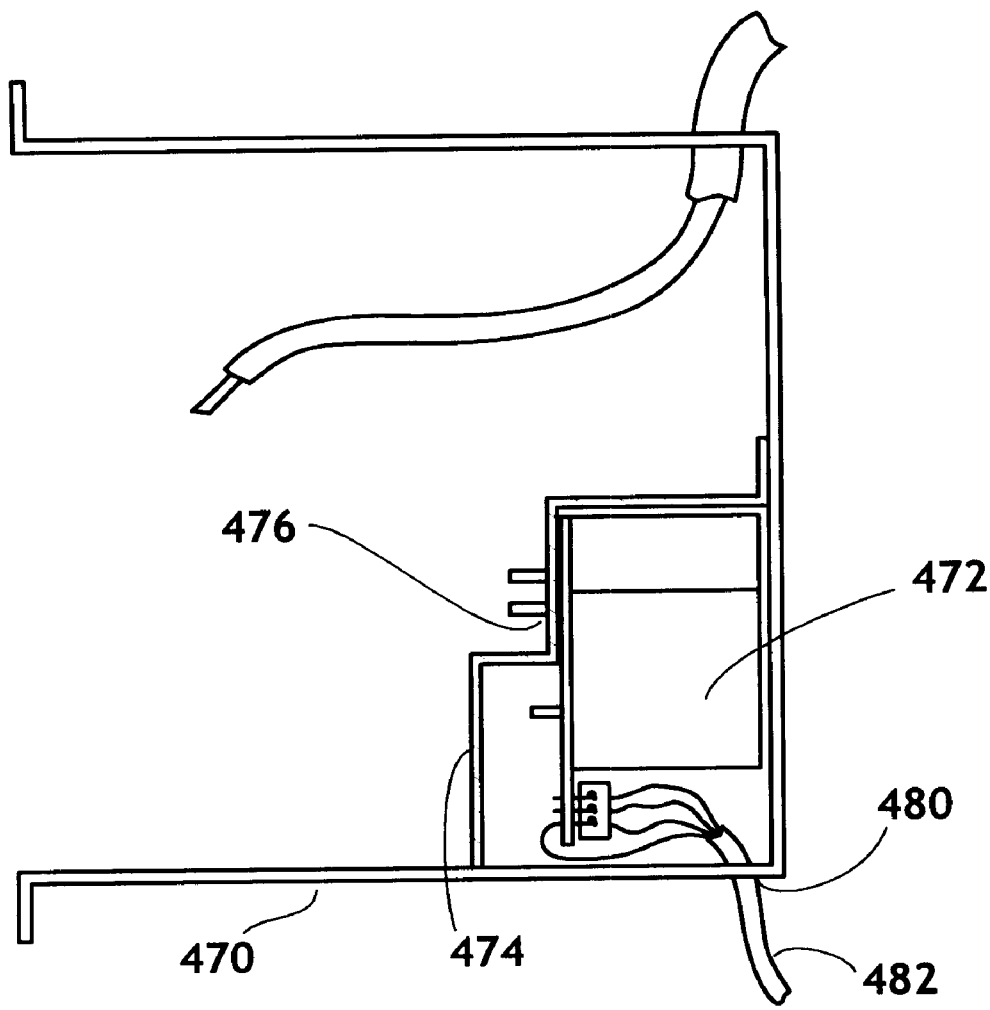
FIG. 32 is a side view of a single gang electrical device housing having within an offset plate for separating and enclosing a control device, in accordance with an alternative embodiment of the invention.

Referring to FIG. 32, there is illustrated an alternative device housing assembly 470 for enclosing a circuit board 472 or other low voltage device and an electrical device (not shown). The circuit board 472 is attached to an offset plate 474. The offset plate 474 has an aperture 476 for passing controlled wires therethrough, and mounting elements (not shown) for mounting the offset plate 474 to the walls of the assembly 470. The offset plate 474 also serves as a divider plate to separate a low voltage device from a high voltage device. An aperture 480 is provided at the bottom of the device housing assembly 470 to enable passage of controlling wires 482 therethrough.

Figure 33:
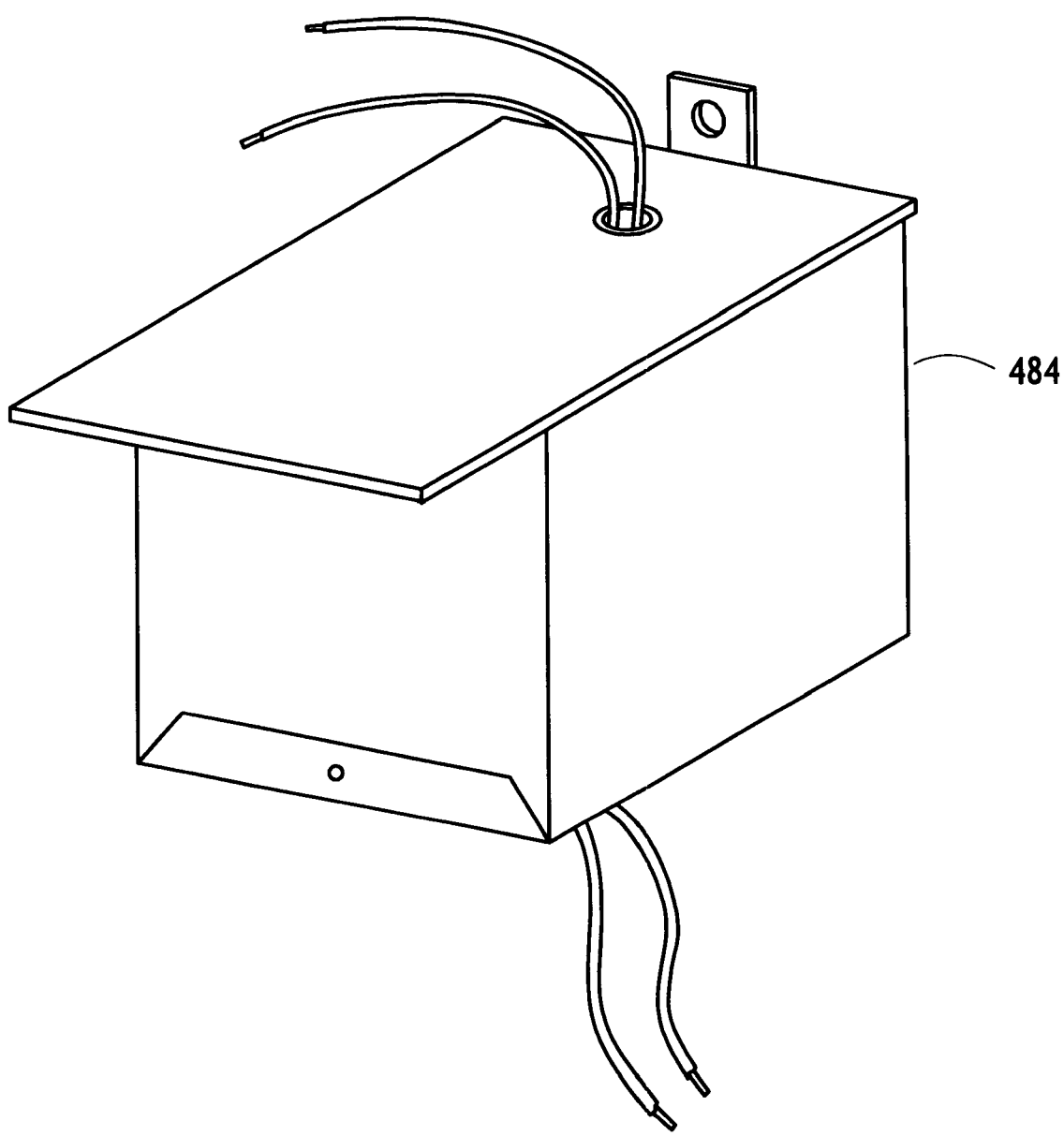
FIG. 33 is a schematic perspective view of a control device module in accordance with an alternative embodiment of the invention.

Referring to FIG. 33, there is a pre-assembled control device module 484 for mounting to a electrical device housing (not shown) having a full set of electrical device mounting elements. In this connection, no electrical device mounting elements are provided on the module 484. In all other respects, the module 488 resembles module 260 illustrated in FIG. 14.

Figure 34:
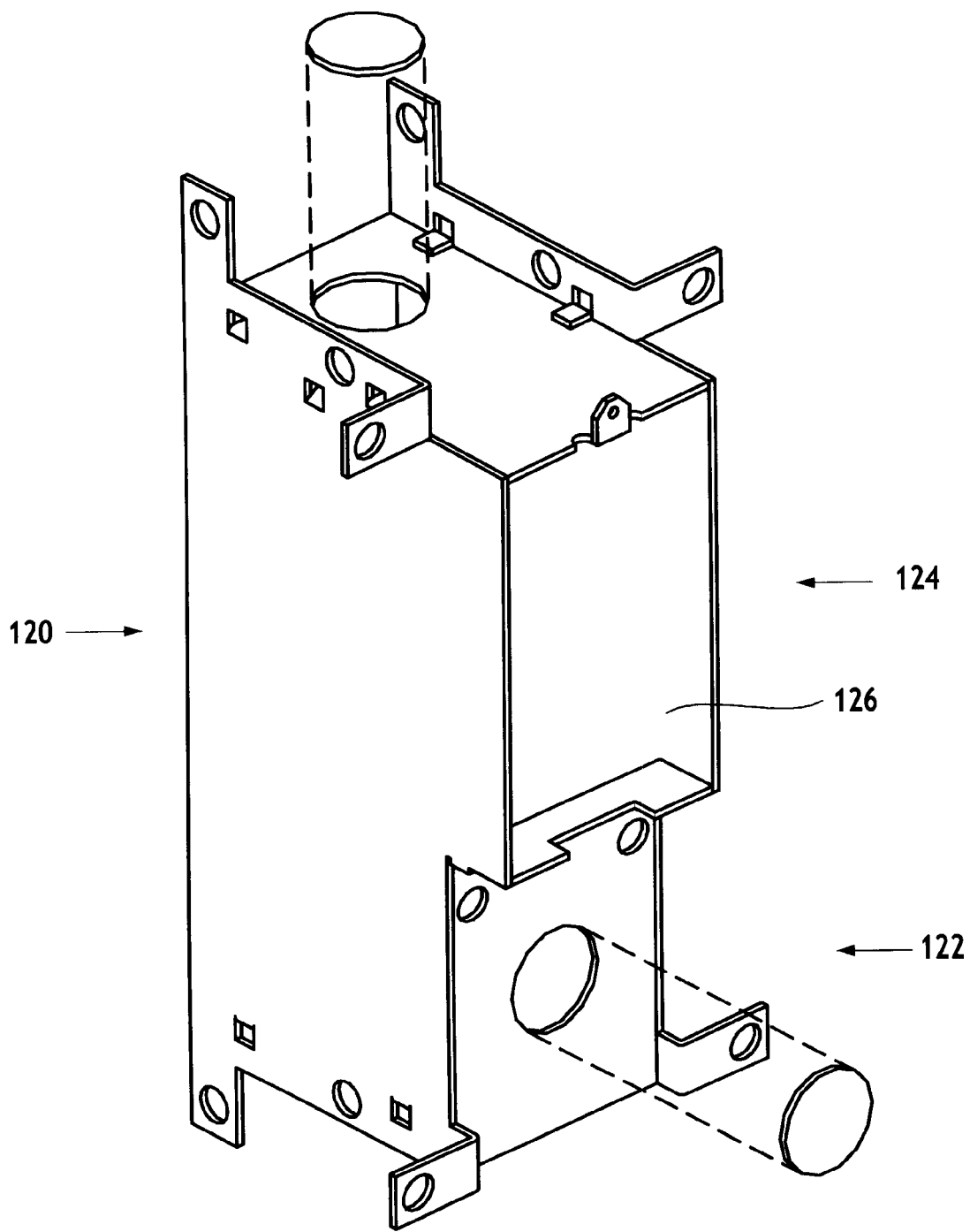
FIG. 34 is a schematic isometric view of a device housing assembly for electrical and control devices in accordance with a third embodiment of the invention.

FIG. 34 illustrates another embodiment of the invention suitable for new construction in which the electrical device housing 12 and the control device housing 18 of the embodiment shown in FIGS. 1–8 are combined in a unitary housing 120. Unitary housing 120 accepts divider plate 14 and offset plate 16 in the same manner as electrical device housing 12 as described above, the divider plate 14 partitioning the unitary enclosure 120 into a control device compartment 122 and an electrical device compartment 124. The ledges 40 of the embodiment shown in FIGS. 1–8 are not necessary so that the unitary enclosure 120 provides a wider opening 126 for the installation of control devices in the lower portion.

Other modifications and alternatives will be apparent to those skilled in the art. The invention is defined in the claims.

What is claimed is:

1. A control device module for mounting to an electrical device housing having a front opening large enough to pass a control device therethrough, a connector opening for passing a controlled connector therethrough, and an insufficient number of mounting elements to mount the electrical device inside the housing, the module comprising:
   (a) a housing for a control device of the type connnectable to a controlled connector and a controlling connector;
   (b) an aperture in a wall of the control device housing for a controlling connector to pass therethrough into the module to connect to the control device; and,
   (c) an aperture in another wall of the control device housing for the controlled connector connected to the control device to pass therethrough out of the module;
   (d) an electrical device mounting element on the control device housing,
   (e) mounting elements for mounting the module to the electrical device housing such that when mounted, the wall of the module having the controlled connector aperture covers the connector opening of the electrical device housing thereby separating the control device and the controlling connector from the electrical device while providing accessibility to the controlled connector from inside the electrical device housing, and provides the electrical device housing with a sufficient number of mounting elements to mount the electrical device.

2. An assembly for housing an electrical device and mounting a control device for controlling the electrical device, the electrical device of the type having two spaced mounting elements, the control device of the type connectable to both a controlled connector and a controlling connector, the assembly comprising:
   (a) an electrical device housing having a first electrical device mounting element at the front of the housing, a front opening in the housing large enough to pass the control device therethrough, and, a connector opening for passing the controlled connector and at least part of the control device therethrough, (b) a control device housing having an opening for a control device to pass therethrough;

(c) a divider plate having an interior surface and an exterior surface adapted to mount the control device housing thereto, an aperture for passing the controlled connector therethrough, and a second electrical device mounting element, (d) mounting elements for mounting the divider plate to the electrical device housing such that when mounted with the divider plate interior surface facing inside the electrical device housing, the divider plate covers the connector opening thereby separating the control device and controlling connector from the electrical device while providing access to the controlled connector from within the electrical device housing, and provides a sufficient number of mounting elements to the electrical device housing to mount the electrical device.

3. The assembly of claim 2 wherein the dimensions of the divider plate, control device housing, and the front and connector openings of the electrical device housing are selected to enable passage of the control device housing and divider plate through the front opening and at least partly through the connector opening.

4. The assembly of claim 2 wherein the connector opening is at the bottom of the electrical device housing, and the first electrical device mounting element is on the top wall of the electrical device housing.

5. The assembly of claim 2 wherein the electrical device housing further includes a removable connector opening cover for covering the connector opening when the divider plate is not mounted on the electrical device housing, and having a second electrical device mounting element so that the electrical device housing can mount an electrical device.

6. The assembly of claim 5 wherein the connector opening is at the bottom of the electrical device housing.

7. The assembly of claim 5 wherein the bottom of the electrical device housing includes a ledge for the divider plate to rest upon.

8. The assembly of claim 2 wherein the control device housing includes an opening for the controlling connector to pass therethrough.

9. The assembly of claim 2 wherein the electrical device housing comprises a back wall and a pair of side walls all formed from a single sheet of metal.

10. The assembly of claim 2 further including a clamping plate for clamping an electrical cable against a back wall of the electrical device housing, the clamping plate including fastening means for fastening the clamping plate to the inside of the electrical device housing.

11. The assembly of claim 10 wherein the clamping plate is installed near the top of the electrical device housing and the electrical device housing includes on each side wall a tang bendable inwards to secure the clamping plate in place.

12. The assembly of claim 2 wherein the control device housing is mounted to the divider plate by means of a nipple and locknut for threading through the divider plate aperture.

13. The assembly of claim 2 wherein the divider plate further comprises fastening means at the front side edges of the divider plate.

14. An assembly for housing an electrical device of the type having two spaced mounting elements, and for mounting a control device for controlling the electrical device and connectable to both a controlling and a controlled connector, the assembly comprising:

(a) an electrical device housing with:
a front opening large enough to pass the control device therethrough;
mounting elements on the front of the housing for cooperating with the electrical device mounting elements to mount the electrical device to the housing; and,
a connector opening for the controlled connector and at least part of the control device to pass therethrough; and, (b) a divider plate having an interior surface and an opposed exterior surface adapted to mount the control device thereto, an aperture for passing the controlled connector therethrough, and (c) mounting elements for mounting the divider plate to the housing such that when mounted with the divider plate interior surface facing inside the housing, the divider plate covers the connector opening thereby separating the mounted control device and controlling connector from the electrical device while providing access to the controlled connector from within the housing.

15. An assembly for housing an electrical device of the type having two spaced mounting elements, and for mounting a control device for controlling the electrical device and connectable to both a controlling and a controlled connector, the assembly comprising:

(a) an electrical device housing with:
a front opening large enough to pass the control device therethrough;
mounting elements on the front of the housing for cooperating with the electrical device mounting elements to mount the electrical device to the housing; and,
a connector opening for the controlled connector and at least part of the control device to pass therethrough; and, (b) a divider plate having an interior surface and an opposed exterior surface adapted to mount the control device thereto, an aperture for passing the controlled connector therethrough, (c) mounting elements for mounting the divider plate to the housing such that when mounted with the divider plate interior surface facing inside the housing, the divider plate covers the connector opening thereby separating the mounted control device and controlling connector from the electrical device while providing access to the controlled connector from within the housing; and (d) mounting elements for mounting the assembly to a joist or stud.

16. The enclosure assembly of claim 15 wherein the connector opening is in a wall of the electrical device housing.

17. A control device module for mounting to an electrical device housing having a front opening large enough to pass a control device therethrough, mounting elements for mounting the electrical device inside the housing, and a connector opening for passing a controlled connector and at least part of a control device therethrough, the module comprising:

(a) a housing for a control device of the type for controlling the electrical device and being connectable to the controlled connector and a controlling connector;

(b) an aperture in a wall of the control device housing for a controlling connector to pass therethrough; and, (c) an aperture in another wall of the control device housing for a controlled connector to pass therethrough;

the module being adapted to mount to the electrical device housing such that when mounted, the wall of the control device housing having the controlled connector aperture covers the connector opening of the electrical device housing, thereby separating the control device and controlling connector from the electrical device, while providing accessibility to the controlled connector from inside the electrical device housing.

18. A housing assembly for housing an electrical device of the type having two spaced mounting elements and a control device for controlling the electrical device and being connectable to both a controlling and controlled connector, the housing assembly comprising:

(a) a front opening large enough to pass the control device therethrough;

mounting elements on the front of the housing assembly for cooperating with the electrical device mounting elements to mount the electrical device to the housing assembly;

(b) a divider plate adapted to mount the control device on one side thereof, having an aperture for passing the controlled connector therethrough, and mounting elements for mounting the divider plate inside the housing assembly such that when mounted, the divider plate divides the housing into a compartment for housing the electrical device and a compartment for housing the control device and controlling connector, housing the control device and controlling connector, and wherein the controlled connector is accessible from the electrical device compartment.

19. The housing assembly of claim 18, having sufficient mounting elements for mounting two electrical devices in a two gang configuration.

* * * * *